United States Patent [19]

Bale et al.

[11] Patent Number: 5,437,025
[45] Date of Patent: Jul. 25, 1995

[54] SYSTEM AND METHOD FOR RUN TIME CONFIGURATION OF OBJECTS IN AN OBJECT ORIENTED COMPUTING ENVIRONMENT

[75] Inventors: Richard C. Bale, Alpharetta; William L. Rich, Stone Mountain; Floyd W. Shackelford, Beauford, all of Ga.

[73] Assignee: International Business Machines Corporation, Armonk, N.Y.

[21] Appl. No.: 9,297

[22] Filed: Jan. 26, 1993

[51] Int. Cl.⁶ ............................................. G06F 12/02
[52] U.S. Cl. .................................. 395/600; 395/650; 364/DIG. 1
[58] Field of Search ............................... 395/600, 650

[56] References Cited

U.S. PATENT DOCUMENTS

| | | | |
|---|---|---|---|
| 4,853,843 | 8/1989 | Ecklund | 364/200 |
| 4,907,151 | 3/1990 | Bartlett | 364/200 |
| 4,953,080 | 8/1990 | Dysart et al. | 364/200 |
| 5,095,522 | 3/1992 | Fujita et al. | 395/200 |
| 5,129,084 | 7/1992 | Kelly, Jr. et al. | 395/650 |
| 5,151,987 | 9/1992 | Abraham et al. | 395/575 |
| 5,161,223 | 11/1992 | Abraham | 395/600 |
| 5,161,225 | 11/1992 | Abraham et al. | 395/600 |
| 5,206,951 | 4/1993 | Khoyl et al. | 395/650 |

OTHER PUBLICATIONS

*Optimal Selection of Dynamically Available Database Access Plans*, Moore et al., IBM Technical Disclosure Bulletin, vol. 34, No. 10A, Mar. 1992, pp. 376–379.
*Office Class Hierarchy*, Cavendish et al., IBM Technical Disclosure Bulletin, vol. 33, No. 6A, Nov., 1990, p. 20.
Wenger, P. "Dimensions of Object-Based Language Design" ACM OOPSLA '87 Proceedings, pp. 168–182, Oct. 4–8, 1987.
Kim, W. "Object-Oriented Databases: Definition and Research Directions" IEEE Trans. Know. and Data Engr., pp. 327–341, Sep. 1990.
Joseph, J. et al., "Object-Oriented Databases: Design and Implementation" Proc. IEEE, pp. 42–64, Jan. 1991.

*Primary Examiner*—Thomas G. Black
*Assistant Examiner*—Peter Y. Wang
*Attorney, Agent, or Firm*—Bell, Seltzer, Park & Gibson

[57] ABSTRACT

A system and method for run time configuration of objects within an object oriented computing environment permits class substitution, instance redirection and class redirection at run time. Class redirection permits class message calls to be redirected from a first class to a second class at run time. In class redirection, the second class uses all new instances of the first class. Instance redirection enables both class messages and instance messages to be redirected from the first class to the second class of run time. In instance redirection, the second class uses all new and existing instances of the first class. Class substitution enables both class messages and instance messages to be redirected and also enables insertion of a new class into the class hierarchy at run time. In class substitution, the second class uses all new instances and existing instances of the first class and all new instances and existing instances of the descendants of the first class. Class substitution, instance redirection, and class redirection can be used individually or in combination. In addition, multiple classes can be linked together into a single run time module to enhance performance.

24 Claims, 10 Drawing Sheets

| SYSTEM DATA BLOCK | |
|---|---|
| ANCESTOR LIST POINTER/SIZE | 100a |
| PREDEFINED ANCESTOR LIST POINTER/SIZE | 100b |
| PARENT LIST POINTER/SIZE | 100c |
| INSTANCE DATA ARRAY OFFSET POINTER | 100d |
| CLASS DATA ARRAY OFFSET POINTER | 100e |
| INSTANCE FRAME POINTER/SIZE | 100f |
| CLASS FRAME POINTER/SIZE | 100g |
| LOADED/LOADED + CONFIGURED/ LOADED+CONFIGURED+MATERIALIZED FLAGS | 100h |
| CLASS SUBSTITUTING CLASS SDB POINTER | 100i |
| INSTANCE REDIRECTING CLASS SDB POINTER | 100j |
| CLASS REDIRECTING CLASS SDB POINTER | 100k |
| SDB CONFIGURED COPY POINTER | 100l |
| ANCESTOR FEATURE TOTAL | 100m |
| CONFIGURATION FAILURE FLAG | 100n |
| CLASS SECURITY FLAG | 100p |
| CLASS SUBSTITUTING CLASS FLAG | 100q |
| INSTANCE REDIRECTING CLASS FLAG | 100r |
| CLASS REDIRECTING CLASS FLAG | 100s |

FIG. 10.

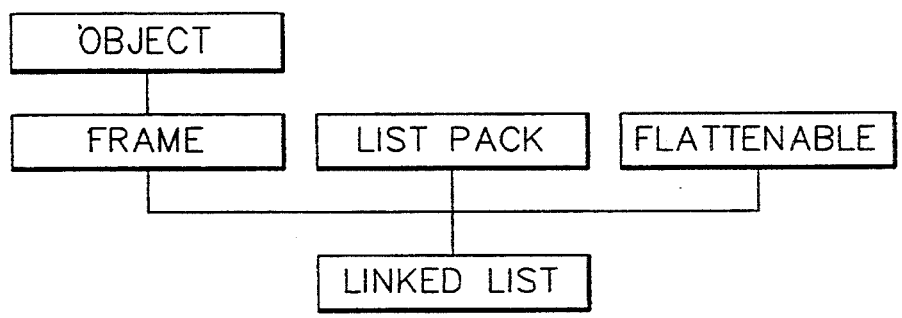

SYSTEM AND METHOD FOR RUN TIME CONFIGURATION OF OBJECTS IN AN OBJECT ORIENTED COMPUTING ENVIRONMENT

FIELD OF THE INVENTION

This invention relates to data processing systems and methods and more particularly to object oriented computing environments.

BACKGROUND OF THE INVENTION

Object oriented programming systems and processes, also referred to as "object oriented computing environments", have been the subject of much investigation and interest in state of the art data processing environments. As is well known to those having skill in the art, object oriented programming systems are composed of a large number of "objects". An object is a data structure, also referred to as a "frame", and a set of operations or functions, also referred to as "methods", that can access that data structure. The frame has many "slots", each of which contains an "attribute" of the data in the slot. The attribute may be a primitive (such as an integer or string) or an object reference which is a pointer to another object. Objects having similar characteristics and common behavior can be grouped together into, and collectively identified as, a "class".

Each defined object will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the named instance, and returning control to the calling high level routine along with the results of the method. The relationships between classes, objects and instances are established during "build time" or generation of the object oriented computing environment, i.e. prior to "run time" or execution of the object oriented computing environment.

In addition to the relationships between classes, objects and instances identified above, hierarchical relationships also exist between two or more classes such that a first class may be considered a "parent" of a second class and the second class may be considered a "child" of the first class. In other words, the first class is an ancestor of the second class and the second class is a descendant of the first class, such that the second class (i.e., the descendant) is said to inherit from the first class (i.e. the ancestor). Referring to FIG. 1, a class hierarchy is illustrated in which class A is the parent of child class B such that B inherits from A. The ancestor/descendant relationship is established at build time when the class, object and instance relationships are established, i.e. prior to execution or processing of messages at run time.

As object oriented computing environments become more commonplace, it becomes increasingly important to allow for greater flexibility in the hierarchical relationships between classes. Typically, the hierarchical relationships between classes can be changed. For example, it is possible to replace Class B in the hierarchy illustrated in FIG. 1 with new Class BB. Referring to FIG. 2, new class BB has been inserted into the hierarchy by updating the ancestor list so that all objects and instances referring to class B are automatically redirected to new class BB.

Still referring to FIG. 2, when a message is sent to class B, it is automatically replaced by a call to new class BB. However, if class B is referenced by an instance reference using persistent data (i.e. data which is maintained from one computing session to the next), class B rather than class BB is invoked. In addition, the present class replace capabilities in object oriented computing environments only permit replacement of existing classes which are leaf nodes in the hierarchy (i.e., exist at the bottom of the hierarchy). For example, in FIG. 1, class B is a leaf node. Thus, the existing replace features in object oriented computing environments do not allow for the replacement of classes at any location in the hierarchy while preserving the inheritance of each class in the hierarchy.

Each time a hierarchy is established, it is necessary to "build" the class in the object oriented computing environment. This "build time" is often referred to as compiling the class and objects. At present, each time a new class is inserted into a hierarchy using class replacement features in object oriented computing environments, it is necessary to rebuild all of the classes before executing the system, i.e. prior to "run time".

The need to rebuild all of the classes after insertion of a new class into the hierarchy results in a significant increase in the ultimate processing time for a user to obtain output from a computer system. In addition, the need to replace classes which have persistent data associated with them results in undesirable inconsistencies. The restriction of class replacement features to replacement of only leaf nodes in a hierarchy also severely limits the flexibility of computer systems in general, and in particular, those in an object oriented computing environment.

Finally, it will be understood by those having skill in the art that computer programs, including object oriented computer programs, are typically distributed as object code only, so that the source code remains confidential. Unfortunately, if customization of the object objected computing environment is required, along the lines already described, user access to the source code for the object oriented computing environment may be required. User access to the source code may jeopardize confidentiality of the developer's source code. Accordingly, there is a need to allow for customization of the object oriented computing environment, without requiring user access to the source code thereof.

SUMMARY OF THE INVENTION

It is therefore an object of the present invention to provide an improved object oriented computing environment.

It is another object of the present invention to provide an object oriented computing environment including a system and method for run time configuration of objects.

It is yet another object of the present invention to provide replacement of classes having persistent data associated with them.

It is still another object of the present invention to provide an object oriented computing environment capable of run time configuration of objects in which it is not necessary to build all classes prior to run time.

These and other objects are provided, according to the present invention, by providing run time class redirection, instance redirection, and class substitution capability at run time, i.e. during execution of an object oriented computing environment. Class redirection causes class message calls to be redirected from a redirected class to a redirecting class which is a descendant of the redirected class. Instance messages are not redirected. Class redirection results in use of all new instances of the redirected class by the redirecting class. In class redirection, the redirecting class does not use the existing instances of the redirected class or instances, new or existing, of the descendants of the redirected class.

Instance redirection includes the capability of class redirection and also causes all message calls, class or instance, to be redirected from a redirected class to a redirecting class which is a descendant of the redirected class. Instance redirection results in use, by the redirecting class, of all new instances and all existing instances of the redirected class. In instance redirection, the redirecting class does not use any instances, new or existing, of the descendants of the redirected class.

Class substitution, which permits substitution of a class into the class hierarchy at any point at "run time", is also provided according to the present invention. Class substitution in an object oriented computing environment according to the present invention provides the capabilities of instance redirect (redirection of all message calls, class or instance, to the substituted class) and identifies the substituted class as an ancestor for all descendants of the substituted class. Class substitution results in use, by the substituting class, of all new and existing instances of the substituted class and all new and existing instances of the descendants of the substituted class. It is also possible according to the present invention to link multiple classes together into a single run time module thereby significantly enhancing performance.

In particular, a system for configuring objects at run time operates in an object oriented computing environment which includes an object oriented data processor and objects that are categorized into classes which define methods of the objects and which operate on the data processor. Each object has an object reference, and includes an object frame and at least one object method. The object frame contains attributes for the object. The classes form a hierarchy such that a first class is a parent to a second class and the second class is the child to the first class and thus, the parent or first class is said to be the ancestor of the child or second class and the child or second class is said to be the descendant of the parent or first class. As a result, the parent class inherits the characteristics from the child class. The system also includes instances in the data processor which are associated with an object. Each instance contains an instance frame which in turn contains data related to a corresponding attribute of the associated object. An object manager which operates on the data processor performs queries of the objects by sending class messages to objects to invoke methods upon the objects and by sending instance messages to instances to invoke methods upon the instances of the object.

A system according to the present invention for configuring objects at run time in an object oriented computing environment, includes system data blocks (SDB) in the data processor, each of which are associated with a class. A system data block includes a plurality of pointers, one of the pointers pointing to the system data block for the class that is instance redirecting (child class).

The system also includes object references, each corresponding to an object, which includes pointers: an instance identifying pointer for identifying an instance of a corresponding object and a system data block pointer for identifying a system data block associated with the instance.

Run time initialization means and set object identification means also form a part of the system. The run time class initialization means which is responsive to an instance redirect request from a parent class to a child class, sets the instance redirecting pointer in the system data block for the parent class to identify the system data block of the child class. The set object identification means which is responsive to run time initialization means, obtains the instance redirecting pointer from the system data block for the parent class and the object identifier of the parent class, and stores them in the instance identifying pointer and the system data block pointer, respectively, of the object reference.

In operation, instance message responsive means obtains the instance redirecting pointer stored as the instance identifying pointer in the object reference and the object identifier for the child class and responds to the instance message directed to the parent class using the instance redirecting pointer and the object identifier. This results in the instance message being redirected from the parent class to the child class.

In addition, the system is also capable of redirecting class messages from a parent class to a child class. Where the system is redirecting class messages from a parent class to a child class, the system data block also includes a class redirecting pointer which identifies a system data block that is associated with a child class of the object class. Furthermore, each object reference also includes a class identifying pointer to identify a class of the corresponding object and a system data block pointer to identify the system data block of the class of the corresponding object.

The run time initialization means is responsive to a class redirect request, and sets the class redirecting pointer in the system data block of the parent class to identify the system data block associated with the child class. The set object identification means obtains the associated class redirecting pointer from the system data block of the parent class and also obtains the associated object identifier for the parent class. The set object identification means also stores the class redirecting pointer in the class identifying pointer of the object reference of the child class and stores the object identifier in the system data block pointer of the object reference of the child class.

In operation, class message responsive means obtains the class redirecting pointer stored in the class identifying pointer of the object reference and the object identifier from the object reference of the child class and responds to the class message directed to the parent class using the class redirecting pointer and the object identifier. This results in the class message being redirected from the parent class to the child class.

The system according to the present invention also enables class substitution. In addition to those pointers and object references for the system when it is enabling instance redirection, the system data block also includes a class substituting pointer to identify a system data block associated with a child class of the object class. The run time initialization means also forms a part of the system for enabling class substitution. The run time initialization means, in response to a class substitute request from a parent class to a child class, sets the class substituting pointer in the system data block for the parent class to identify the system data block associated with the child class.

In operation, system data block replacement means replaces the system data block of the child class with the system data block of the parent class using the class substituting pointer which identifies the system data block of the child class.

BRIEF DESCRIPTION OF THE DRAWINGS

FIG. 10 illustrates the structure of the system data block of FIGS. 4 and 5.

FIG. 11 illustrates an example of the ordering of entries in an ancestor list.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Prior to describing a system and method for configuring objects within an object oriented computing environment at run time according to the present invention, a general overview of object oriented systems and methods will be provided. A general description of the system and method of the present invention will then be provided, followed by a detailed design description for the system and method for run time configuration of objects within an object oriented computing environment according to the present invention.

Object Oriented Computing Environment

In an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the class. Object classes can be defined to be subclasses of other classes. Subclasses inherit all of the data characteristics and methods of the parent class. They can add additional data and methods and they can override or redefine any data elements or methods of the parent class. An object is typically represented schematically by a ring in which the center of the ring contains the data structure represented by a frame having slots, each of which contains an attribute of the data in the slot. Sectors of the ring are used to indicate the object's methods which encapsulate the frame and may be used to perform actions on the data encapsulated in the frame.

Figures 1, 2:
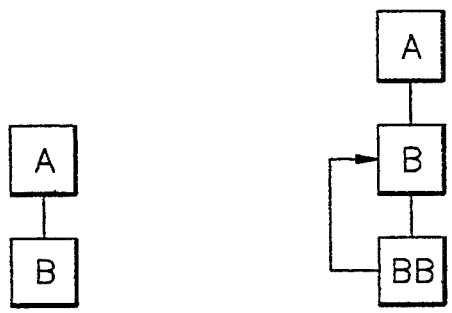
FIG. 1 illustrates a hierarchical relationship between two classes in an object oriented computing environment.
FIG. 2 illustrates replacement of a class in a hierarchical relationship of classes by a new class.
Figure 3:
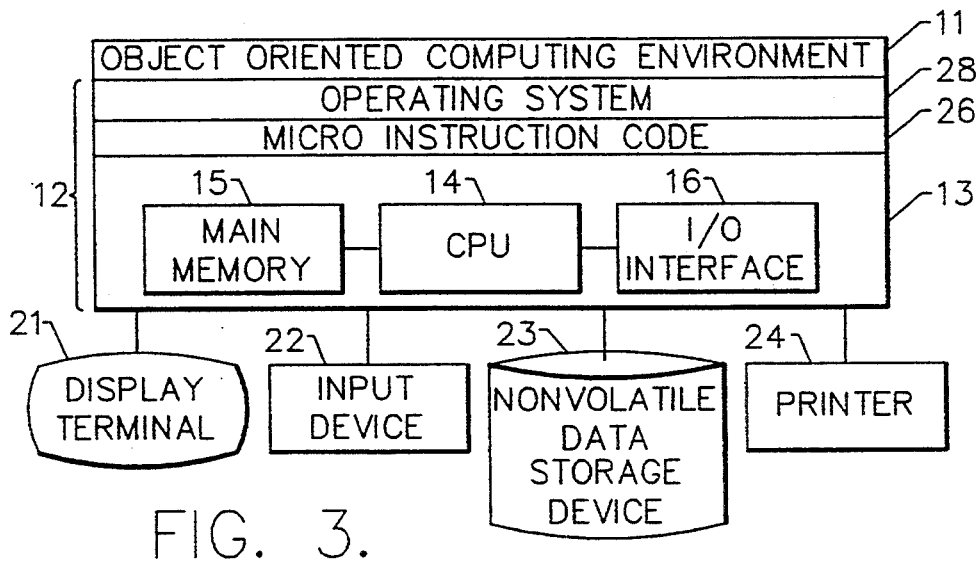
FIG. 3 illustrates a block diagram of an object oriented computing environment and its associated hardware platform.

Referring now to FIG. 3, the hardware and software environment in which the present invention operates will now be described. As shown in FIG. 3, the present invention is a method and system for configuring objects within an object oriented computing environment 11 operating on one or more computer platforms 12. It will be understood by those having skill in the art that computer platform 12 typically includes computer hardware units 13 such as a central processing unit (CPU) 14, a main memory 15, an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computer platform 12 also typically includes microinstruction codes 26 and an operating system 28.

As shown in FIG. 3, object oriented computing environment 11 operates on computer platform 12. For example, each computer platform 12 may be a computer having an IBM System 370 architecture. However, it will be understood by those having skill in the art that object oriented computing environment 11 may operate across multiple computer platforms. Operating system 28 may be an IBM multiple virtual storage (MVS). Object oriented computing environment 11 is preferably written in Intermediate C, which is an object oriented dialect of the C computer programming language and is similar to the C++ computer programming language. The design and operation of computer platforms and object oriented computing environments including that of an object manager, are well known to those having skill in the art and are described, for example in U.S. patent application Ser. No. 07/602,442, filed Oct. 23, 1990 to Abraham et al. entitled *A Messenger and Object Manager to Implement an Object Oriented Environment* now U.S. Pat. No. 5,265,205; and U.S. Pat. Nos. 5,161,225 to Abraham et al. entitled *Persistent Stream for Processing Time Consuming and Reusable Queries in an Object Oriented Database Management System;* 5,151,987 to Abraham et al. entitled *Recovery Objects in an Object Oriented Computing Environment;* and 5,161,223 to Abraham entitled *Resumeable Batch Query for Processing Time Consuming Queries in an Object Oriented Database Management System*, all assigned to the assignee of the present invention, the disclosures of which are hereby incorporated herein by reference, and in numerous textbooks such as *Object Oriented Software Construction* by Bertrand Meyer, published by Prentice Hall in 1988, the disclosure of which is incorporated herein by reference.

Run time Object Configuration System: Overall Design and Operation

Figure 4:
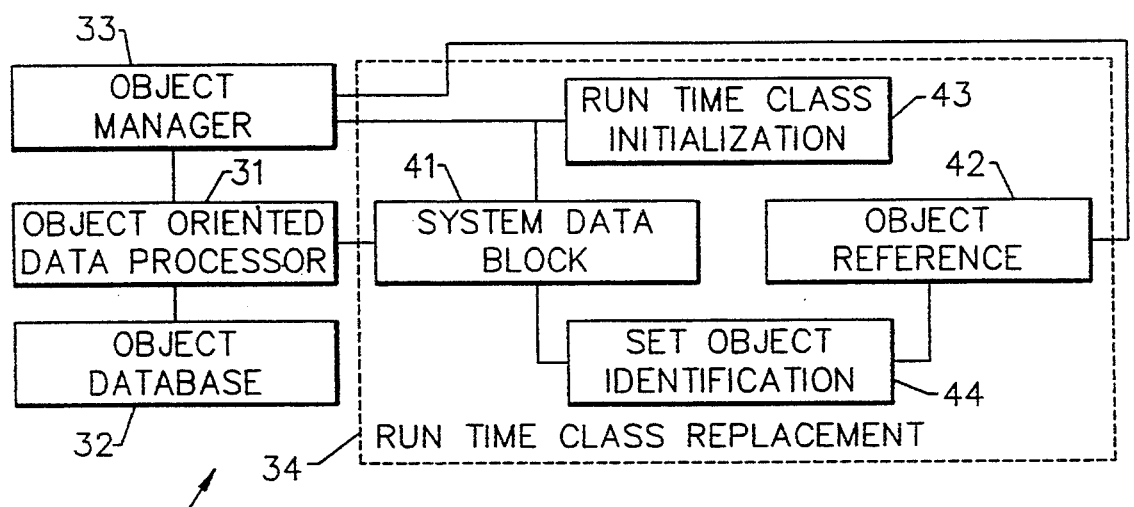
FIG. 4 illustrates a block diagram for run time configuration of objects using class redirection and instance redirection according to the present invention.
Figure 5:
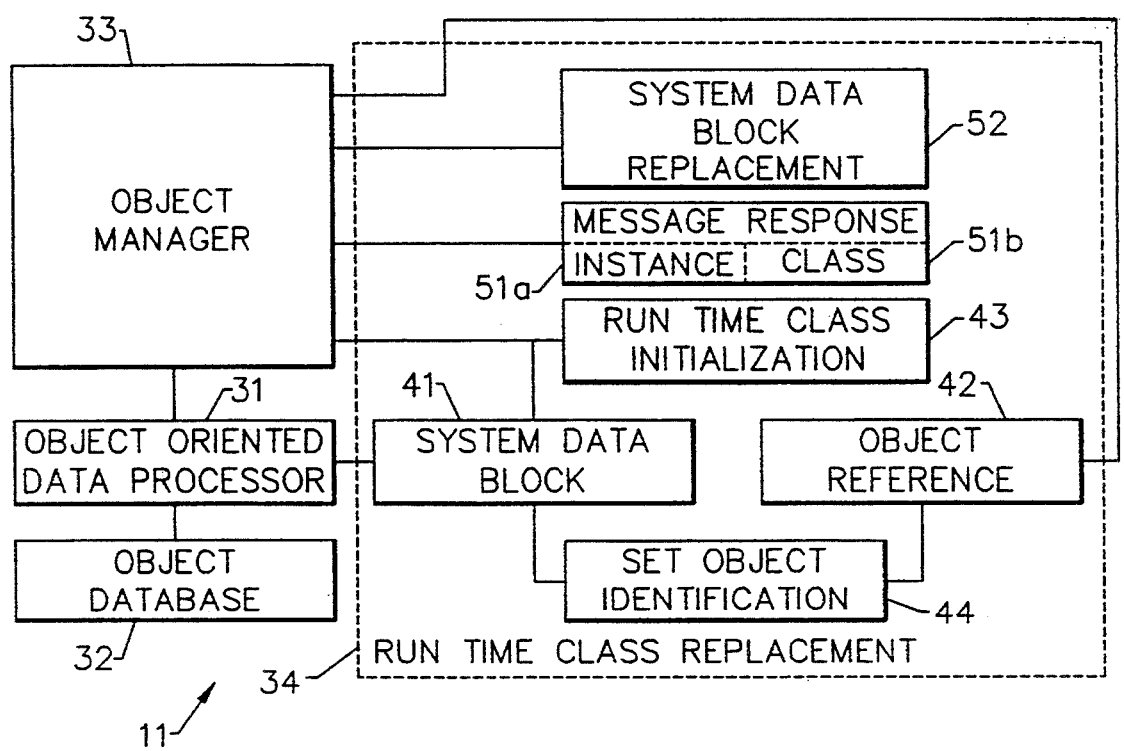
FIG. 5 illustrates a block diagram of run time configuration of objects using class substitution according to the present invention.

Referring to FIGS. 4 and 5, a system for configuring objects within an object oriented computing environment at run time according to the present invention is shown. This particular embodiment of the run time configuration system illustrates run time class replacement. As shown, the system is included in object oriented computing environment 11 (FIG. 3) and provides for run time class replacement for redirecting a class message and an instance message from a first class to a second class.

As also shown in FIGS. 4 and 5, the run time configuration system includes an object oriented data processor 31 and an object database 32. The object database 32 which operates on the object oriented data processor 31 consists of objects categorized into classes that define methods of the objects, the methods operating on object oriented data processor 31. Each of the objects in the object database comprise an object frame and an object method such that the object frame contains an attribute of the object.

The classes in database 32 form a hierarchy in which two classes are related such that the first is a parent of the second and the second is a child of the first. Stated another way, the first is the ancestor of the second, and the second is the descendant of the first. As a result, the second class inherits from the first class. In addition, database 32 also includes instances which are associated with an object. The instances each have an instance frame which contains data relating to a corresponding attribute of the object.

Still referring to FIG. 4, the run time configuration system also includes object manager 33 and run time class replacement means 34. Object manager 33 operates on object oriented data processor 31 for performing queries of database 32. The queries are performed by sending class messages to an object to perform an action or method associated with the object on the object and by sending instance messages to an instance of the object to perform an action upon the instance of the object.

Run time class replacement means 34 also operates on the object oriented data processor 31. It dynamically redirects a class message and an instance message from a parent or first class to a child or second class. Run time class replacement means 34 includes system data block 41, object reference 42, run time class initialization means 43, and set object identification means 44. System data block 41 which will be discussed in more detail with respect to FIG. 10, maintains a pointer identifying the system data block for a class that is class redirecting and also maintains a pointer identifying the system data block for the class that is instance redirecting. Object reference 42 maintains a number of pointers including a pointer which points to the instance for the corresponding object and a pointer which points to the system data block for the class of the object instance.

Still referring to FIGS. 4 and 5, run time class initialization means 43 operates in combination with object manager 33 to set the class redirecting pointer and the instance redirecting pointer in system data block 41. Set object identification means 44 obtains the class redirecting pointer from system data block 41 and the instance redirecting pointer from system data block 41 and the object identifier, and then stores the class redirecting pointer and object identifier in object reference 42. Referring to FIG. 5, message response 51 consists of two components, one responsive to instance messages 51a and the other responsive to class messages 51b. Once set object identification pointer 44 has stored the class redirecting pointer and object identifier in object reference 42, message response 51 redirects the class message and the instance message to the second class. Instance message response means 51a obtains the instance redirecting pointer and the object identifier from the object reference of the child class and responds to the instance message using the obtained instance redirecting pointer and object identifier to thereby redirect the instance message from the parent class to the child class. Similarly, class message response means 51b obtains the class redirecting pointer and the object identifier from the object reference of the child class and uses the class redirecting pointer and object identifier to respond to the class message to thereby redirect the class message from the parent class to the child class.

Referring to FIG. 5, the run time configuration system for implementing class substitution at run time will now be described. Class substitution in general, inserts a class into the class hierarchy at any point during run time. Similar to instance redirect, class substitution redirects all message calls, including instance message calls and class message calls, from the substituted class (parent or first class) to the substituting class (child or second class). In addition, the substituted class (parent class) is inserted into the ancestry for all descendants. Thus, class substitution results in use, by the substituting class (child class), of all new and existing instances of the substituted class (parent class) and all new and existing instances of the descendants of the substituted class (parent class).

In particular, the object configuration system for class substitution includes many of the same components as the run time configuration system discussed above for instance redirection and class redirection as illustrated in FIG. 5. In addition to those components for instance redirection and class redirection, system data block 41 also includes a class substituting pointer to identify a system data block associated with the child class of the object class. Run time initialization means 43 sets the class substituting pointer in the system data block of the parent class to identify the system data block associated with the child class in response to a class substitute request from a parent class. Finally, system data block replacement means 52 replaces the system data block of the child class with the system data block of the parent class. This is in response to a class substitution request.

Run Time Object Configuration System: Detailed Design and Operation

Having presented an overview of the design and operation of the run time object configuration system and method of the present invention, a detailed description of the design and operation will be provided.

TERMS

At the outset, it is helpful to define several terms used frequently hereinafter. These terms are as follows:

- RUN-TIME CLASS INITIALIZATION ROUTINE (RCI)—This is a routine that initializes all the classes in the run-time system, and specifies all class substitutions, instance redirections, and class redirections between classes. This routine is available in source code, so it can be modified and recompiled for any changes.
- CLASS DEFINITION TABLE (CDT)—This table defines all the classes in the system for the build-time tools. This table defines the class id (unique class number), class short name, and class long name for each class. It also contains a column to specify the class into which a given class is linked.
- CLASS RANGE TABLE (CRT)—This is the run-time version of the class definition table. This table is initialized by the run-time class initialization routine.
- ANCHOR BLOCK—This is a storage area used in the run-time system to store global information used by the object manager.
- SYSTEM BLOCK—This is a storage block used by the object manager to deliver a message call.
- LOADED CLASSES TABLE (LCT)—This is a run-time table that points to all classes (SDBs) that have been loaded. This table is implemented as a sparse array to optimize the lookup for a class.

EFFECTS OF CLASS REPLACEMENT

When implementing a subclass, consideration should be given to which of the class replacement techniques, if any, is appropriate for the circumstances. Neither class substitution, instance redirection, or class redirection is necessary when all clients can be modified resulting in knowledge of the new class at build time. General guidelines are as follows:

- CLASS SUBSTITUTION—provides functionality in the new class which effects all newly created instances, all currently existing persistent instances in the database, and all descendant classes.
- INSTANCE REDIRECT—provides functionality in the new class which affects all newly created instances and all currently existing persistent instances in the database. Descendant classes are not affected.
- CLASS REDIRECT—provides functionality in the new class which effects only all newly created instances. Currently existing persistent instances in the database (or the class is not persistent) and descendant classes are not affected.

Other reasons to consider using class substitution include: (i) the source for compiling the descendants is not available; and (ii) the added functionality does not implement a substantial change and the function is to be added without regenerating all descendant classes or changing their parents.

Instead of using class substitution, modification of all descendants and clients so they know about the new class at build-time may be desired. If the new function is a major revision, then descendants should be changed to inherit from the new class and recompiled. This allows the descendants of the new class to redefine the new behaviors as needed. If all clients of the class are modified to refer to the new class, then class substitution is not necessary. If all descendants can be modified to inherit from the new parent, but all clients cannot be modified to refer to the new class, instance or class redirection should be implemented instead of class substitution.

Class or instance redirection is advantageous when: (i) the client source is not available; (ii) the functional change implemented in the new class is minor and it is easier to use class or instance redirection than it is to modify all clients; and/or (iii) existing instances of the parent class are in the database and they are to invoke the functions of a new class. In the later case, instance redirection, not class redirection should be implemented.

Three interfaces are provided to specify class substitution (CS), instance redirect (IR), and class redirect (CR). A run-time class initialization routine (RCI) is used to specify these class replacement characteristics. Run time class initialization will be described hereinbelow with respect to FIG. 6. Other mechanisms may be used. Multiple substitutions and redirections can be specified in combination with each other according to the rules described hereinbelow (e.g. a substitution can be implemented on top of another substitution, or a redirection can be implemented on top of a substitution). If an incompatible substitution or redirection is implemented, an exception or error is raised.

When implementing class redirection, all newly created instances will be of the class redirecting type. Any old persistent instances created prior to the class redirection will continue to operate as the class redirected type. If a copy of one of these old persistent instances is made, it will also be of the class redirected type, and not the class redirecting type. When using class redirection for persistent instances, it is possible that instances of both the original and new classes can exist in the system. Panels that display the object, and the database table that stores the object and class level methods of the new class need to be capable of handling both types of instances.

When redirecting message calls, the type of redirection, class versus instance, is actually determined by the type of object reference—not by the message call being at either the class or instance level. Object references can be either "class" references, or "instance" references. A class reference is obtained when either the "CLASS_REF", "id_to_ref" or "name_to_ref" interface is used. An instance reference is obtained when an object is created or materialized. When message calls are made using a "class" type object reference, then class redirection applies. When message calls are made using an "instance" type object reference, then instance redirection applies. Note that when a new instance is created, the create method is usually invoked on a class reference. Thus, class redirection will occur on a create message call. Using these rules, a class level message call using an instance reference will result in instance redirection, and not class redirection.

As an example of use of the redirecting function, several functions may present the class short name to the user on panels, and may store class numbers in the database. These functions may be modified to translate the class number to the new class substitution or instance redirection (but not class redirection) class. These changes will allow the user specifications made for the original class to apply automatically to the class substitution or instance redirection class. As a result, the user may not be required to re-enter all of the security authorizations for the instance redirecting class. Existing values in the database for these functions will then apply to the instance redirecting class, and database migration will not be required.

In particular, all the security authorizations that were set up for the instance redirected class (first class) can be applied to the instance redirecting class (second class). However, the maintenance functions will continue to display the class under which the original specification was made. For example, the list panel showing the list of security authorizations, or the list of deferred action table entries, will show the class short name under which the entry was originally specified. This can lead to a situation where multiple class short names all logically apply to the same entity.

For the deferred action table and security category mapping, an entry can exist under both the instance redirecting class, and one or more instance redirected classes. When a request to do a security category mapping or to find a deferred action table entry for a class is received, these functions will search first for an entry under the redirecting class. If the redirecting class does not have an entry in the database, then the search will continue through all instance redirected classes in order of the nearest ancestor to the redirecting class. This is how the instance redirected class' entries are automatically picked up.

For security authorization maintenance and deferred action table maintenance, when a File.New or File.Open is performed to maintain a record and the user enters an instance redirected class name on one of these panels, it can be accepted and automatically converted to the instance redirecting class with an informational message to the user to make note of the name change. As a result, in order to maintain security authorization and deferred action table, all new records can be entered as the instance redirecting class, and when any record is changed it can be put back under the instance redirecting class. If the user enters a class redirected class name on one of these panels, an informational message can be displayed to notify the user of the class redirection. However, the class name is not changed automatically on the panels for this case.

For security category mapping maintenance, the user can maintain the mappings under both the instance redirected and instance redirecting classes. If an instance redirected class is selected, an informational message can be displayed to notify the user that this class has been instance redirected. Also, if a class redirected class is selected, an informational message can be displayed to notify the user that this class has been class redirected. Nonetheless, the user can maintain entries under both of the classes. If a duplicate entry exists for the redirecting and/or multiple redirected classes, the redirecting class, followed by the instance redirected class which is the nearest ancestor will be used—the other entries will be "dead" entries.

For the security settings, the instance redirecting class can be initialized to the security settings of the redirected class. If multiple classes are all instance redirected to the same redirecting class, then the redirecting class can be initialized to the security settings of the redirected class which is the nearest ancestor that has security settings specified. The security settings for both the redirected and redirecting classes can be maintained separately. If the user never updates the security settings for the redirecting class, the redirecting class continues to be initialized to the settings for the redirected class. The copying of security values from redirected to redirecting classes occurs because the object manager detects that no security settings have ever been specified for the redirecting class. Once the security settings for the instance redirecting class are modified, the security settings of the redirected and redirecting classes involved are maintained and used separately. The security settings are always maintained and used separately, even if the security settings are reset in the future.

When developing a sub-class that is going to be an instance or class redirecting class (or a substituting class), the sub-class should redefine its parent's methods, and not rename them out of the way and ignore them. The entire redirection schemes rely on the polymorphism that is inherent in object oriented programming. If a method is renamed and ignored by a sub-class, there is no guarantee that it will function properly for a sub-class. However, it could get invoked if the class is redirecting for another class.

The present invention also provides the capability to link multiple classes together into a single load module. This is a significant performance enhancement.

GENERAL OPERATION OF CLASS SUBSTITUTION, INSTANCE REDIRECTION AND CLASS REDIRECTION

Figure 6:
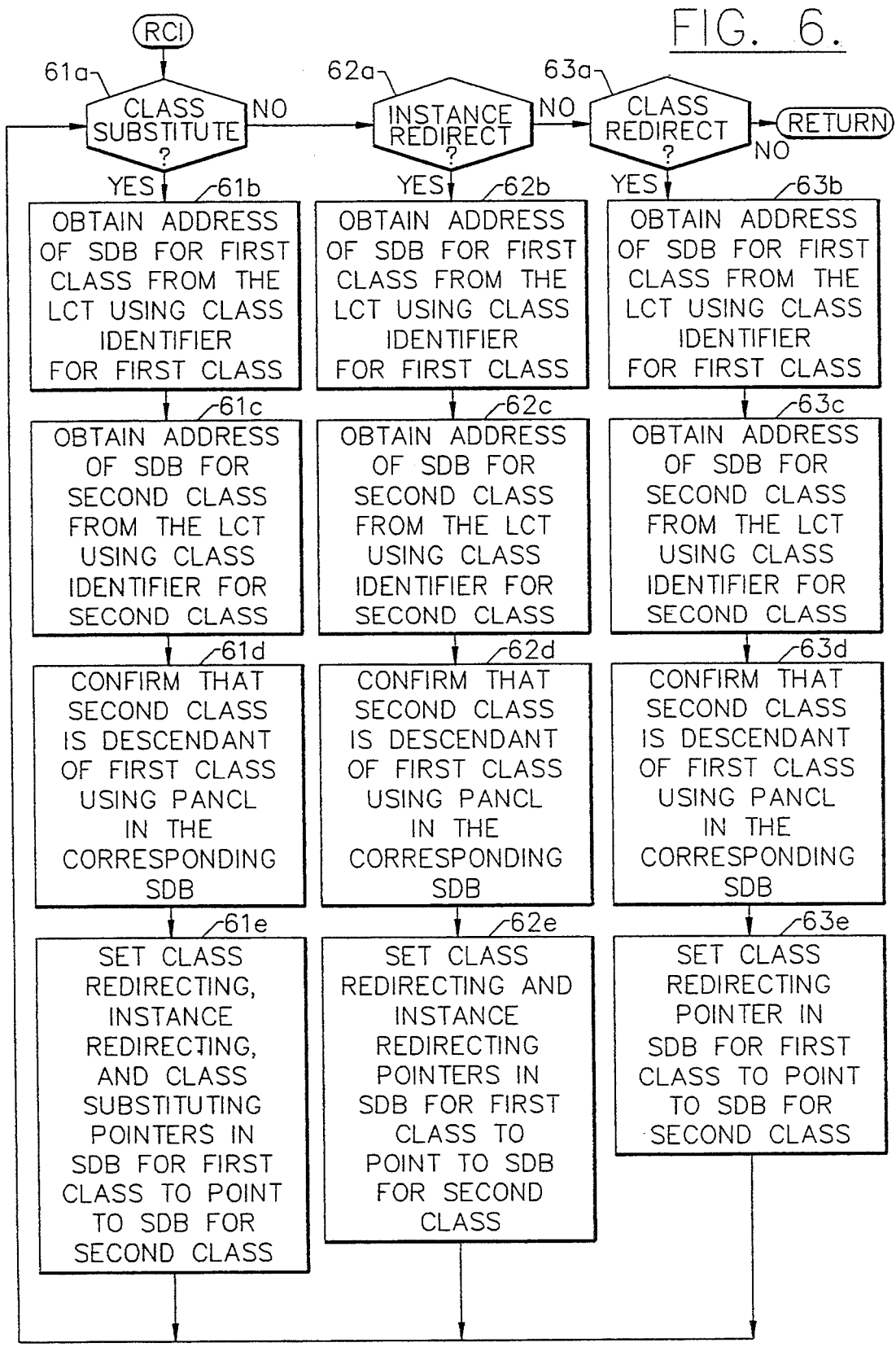
FIG. 6 illustrates operations performed by the run time class initialization means of FIGS. 4 and 5.
Figure 7:
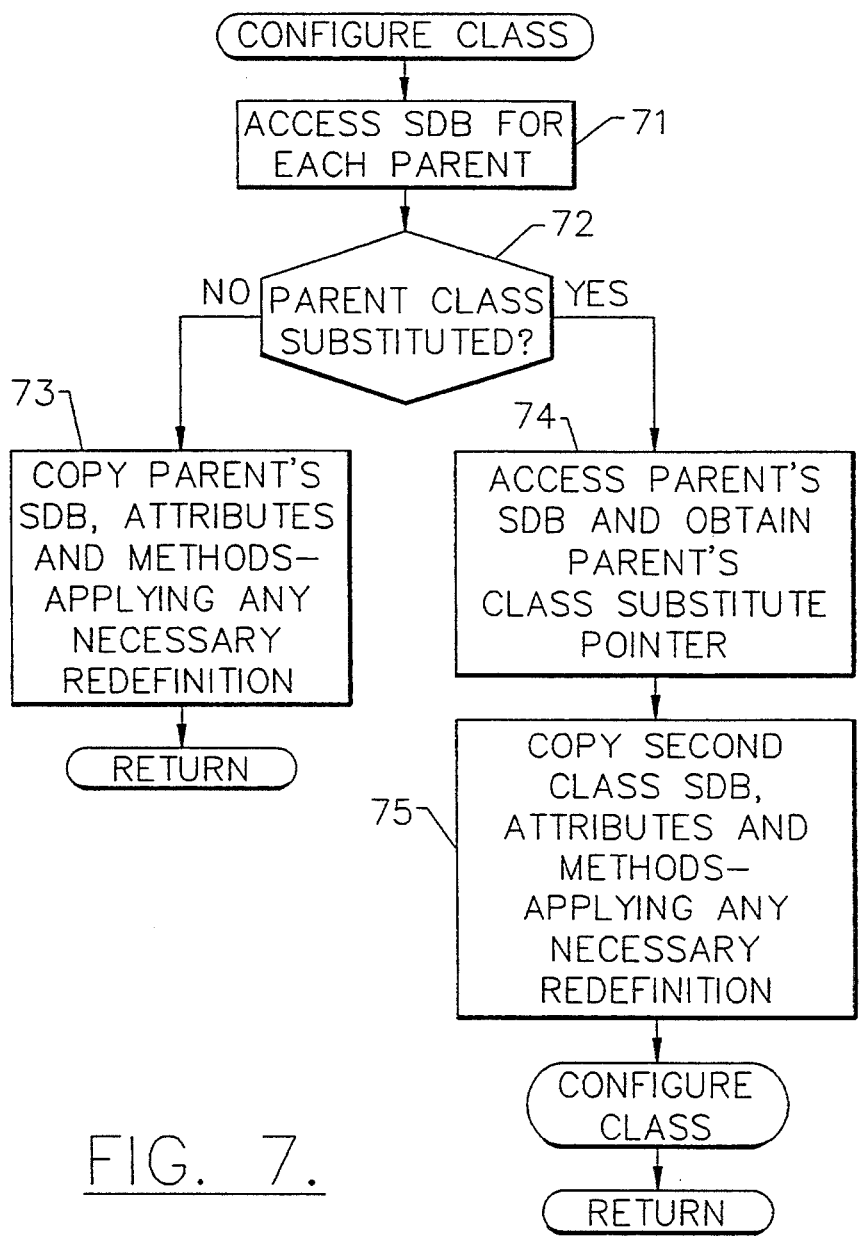
FIG. 7 illustrates operations performed by the object manager of FIGS. 4 and 5 at class configuration.
Figure 8:
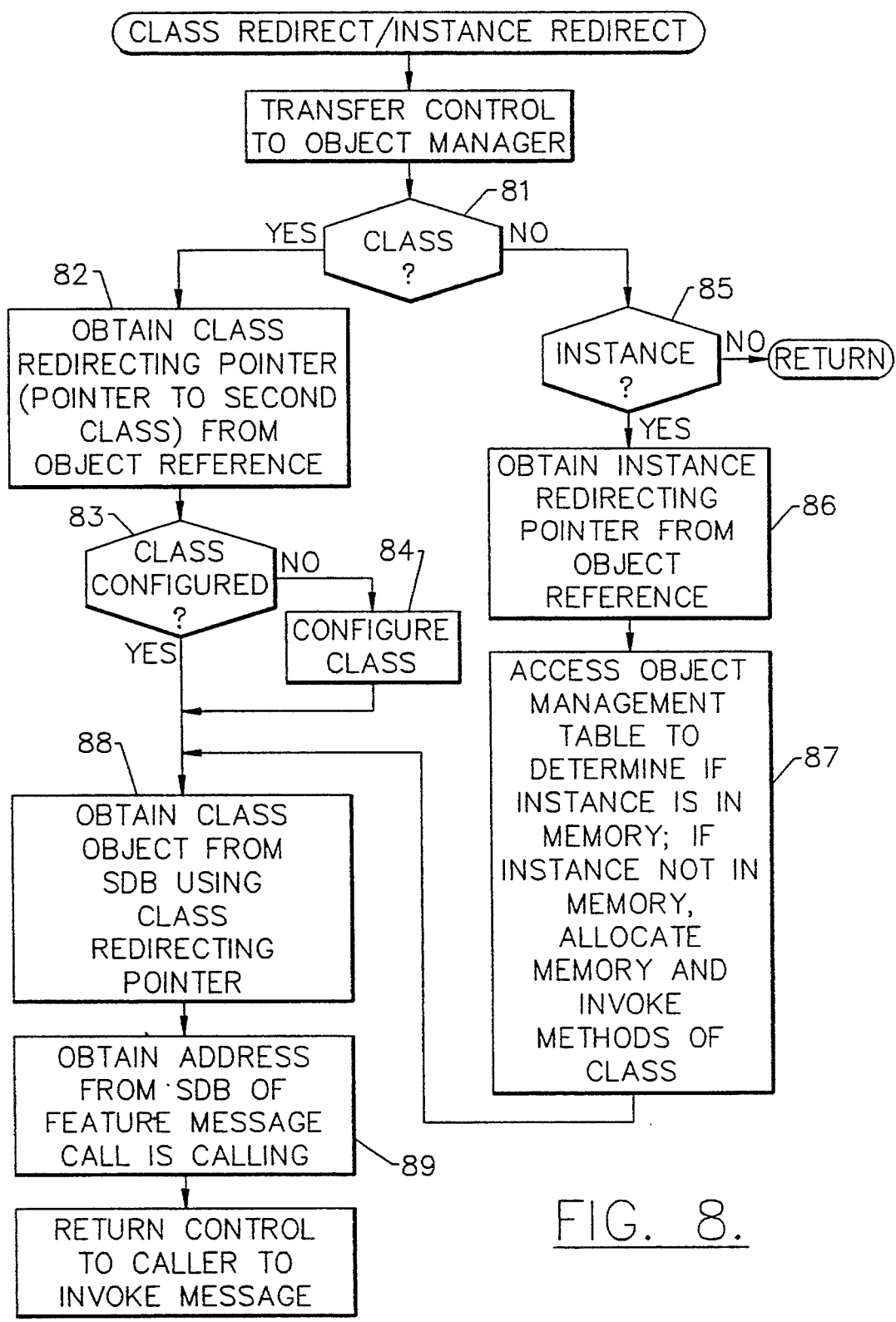
FIG. 8 illustrates operations performed by object manager of FIGS. 4 and 5 at class/instance redirection during run time.

Referring to FIGS. 6-8, the high level operation of class substitution, instance redirection and class redirection will now be described.

Referring to FIG. 6, Run Time Class Initialization (RCI) will now be described. The order of operation by RCI is as follows: (i) class substitution; (ii) instance redirection; and (iii) class redirection. As a result, RCI first completes the initialization of all class substitutions before operating on instance redirections or class redirections. Thereafter, RCI completes the initialization of all instance redirections, and finally initializes all class directions.

At the outset, the object manager determines whether a class is to be substituted (Block 61a). If a class is to be substituted, the object manager obtains the address of the System Data Block (SDB) for the first class from the Loaded Class Table (LCT) using the class identifier for the first class (Block 61b). The object manager also obtains the address of the SDB for the second class from the LCT using the class identifier for the second class (Block 61c). After obtaining the SDB addresses for the first and second classes, the object manager confirms that the second class is a descendant of the first class using the predefined ancestor list (PANCL) in the corresponding SDBs (Block 61d).

After the object manager confirms that the second class is a descendant of the first class, the object manager sets the class redirecting, instance redirecting, and class substituting pointers in the SDB for the first class so that these pointers point to the SDB for the second class (Block 61e). In accordance with the present invention, the object manager will initialize any other class substitutions prior to initializing the instance redirection and class redirection. As such, control is returned to Block 61a and the object manager determines whether another class is to be substituted.

If no class is to be substituted, the object manager determines whether an instance is to be redirected (Block 62a). If an instance is to be redirected, the object manager obtains the address of the SDB for the first class from the LCT using the class identifier for the first class (Block 62b). The object manager also obtains the address of the SDB for the second class from the LCT using the class identifier for the second class (Block 62c). Once the addresses of the SDBs for the first and second classes have been obtained, the object manager, using the PANCL in the SDB, confirms that the second class is a descendant of the first class (Block 62d).

Thereafter, the object manager sets the class redirecting and instance redirecting pointers in the SDB for the first class to reference the SDB for the second class (Block 62e). The object manager then proceeds to initialize all other instance redirects by returning control to decision Block 62a and repeating this process until all instance redirects have been completed.

If the object manager determines that no instance redirects remain, the object manager then proceeds to determine whether a class is to be redirected (Block 63a). If the object manager determines that a class is to be redirected, the object manager obtains the addresses of the SDBs for the first and second classes (Blocks 63b and 63c, respectively). Thereafter, the object manager confirms that the second class is a descendant of the first class (Block 63d) and then sets the class redirecting pointer in the SDB for the first class to point to the SDB for the second class (Block 63e). The object manager then returns control to Block 63a to determine if any additional classes are to be class redirected. If no additional classes are to be class redirected, control is then returned to the calling routine.

Referring to FIG. 7, a high level description of the operation of the object manager during class configuration will now be described. At the outset, the object manager accesses the SDB for each parent (Block 71). After accessing the SDBs for each parent, a determination is made for each parent as to whether the parent class is to be class substituted (Block 72).

If the parent class is not to be class substituted, the object manager copies the parent's SDB, attributes and methods and applies any necessary redefinitions (Block 73). Thereafter, the object manager returns control to the calling process. If the object manager determines at Block 72 that a parent class is to be substituted, the object manager accesses the SDB for the parent and obtains the class substitution pointer from the parent's SDB which points to the SDB for the second class (Block 74). Once the object manager has obtained the class substitution pointer from the SDB of the first class, it uses this pointer to access and copy the second class' SDB, attributes and methods and applies any necessary redefinitions (Block 75). Thereafter, the object manager returns control to the calling process.

Finally, referring to FIG. 8, operation of the class redirect/instance redirect process will be described. At the outset, the object manager determines whether a class is to be redirected (Block 81). If a class is to be redirected, the object manager then obtains the class redirecting pointer from the object reference (Block 82). The class redirecting pointer points to the second class (redirecting class). Upon obtaining the class redirecting pointer, the object manager resolves the class redirecting pointer and determines whether the second class is configured (Block 83). If the second class is not configured, the object manager will cause the second class to be configured (Block 84).

If the object manager determines that a class is not to be redirected (Block 81), it then proceeds to determine whether an instance is to be redirected (Block 85). If an instance is not to be redirected, then the object manager returns control to the calling process. If an instance is to be redirected, the object manager obtains the instance redirecting pointer from the object reference (Block 86). Thereafter, the object manager accesses the object management table (OMT) to determine if the instance is in memory (Block 87). If the instance is not in memory, the object manager allocates memory and invokes the methods of the class.

Still referring to FIG. 8, the object manager, at Block 88, obtains the class object from the SDB, using the class redirecting pointer. This occurs whether a class is to be redirected or an instance is to be redirected. Next, the object manager obtains the address from the SDB of the feature that the message call is calling (Block 89). Finally, the object manager returns control to the calling process to invoke the message.

EXAMPLE OF OPERATION FLOW OF CLASS SUBSTITUTION, INSTANCE REDIRECT AND CLASS REDIRECT

The following example demonstrates the operation of methods when using class substitution, instance redirect, and class redirect. Consider classes X, Y, and Z in the hierarchy, and SAMPLE_CLASS which invokes methods on them.

```
package body SAMPLE_CLASS is
    ...
    - INSTANCE ATTRIBUTES
        x_obj : X;
        z_obj : Z;
    ...
    - INSTANCE METHODS
        procedure sample
        >*(*   Call methods to demonstrate the execution flow
               for class substitution, instance redirect, and
               class redirect.  *)*> is
        begin
            x_obj.find;
            z_obj.find;
            CLASS_REF(X).find;
            CLASS_REF(Z).find;
            x_obj.assign;
            z_obj.assign;
        end;

package body X is
    ...
    - CLASS METHODS
        procedure find
            <*(*   Just return.  Not much of a "find"
                   method.  *)*>;
    - INSTANCE METHODS
        procedure assign
            <*(*   Just return.  Not much of an "assign"
                   method.  *)*>;

package body Y is
    ...
    - INHERIT X;
    - RENAME parent_find renames find,
             parent_assign renames assign;
    - REDEFINE find, assign;
    ...
    - CLASS METHODS
        procedure find
            <*(*   Do something, then call parent_find. *)*> is
        begin
            <*(*   something *)*>;
            parent_find;
        end;
    - INSTANCE METHODS
        procedure assign
            <*(*   Do something, then call parent_assign. *)*> is
        begin
            <*(*   something *)*>;
            parent_assign;
        end;
```

```
package body Z is
  ...
- INHERIT X;
- RENAME parent_find renames find,
         parent_assign renames assign;
- REDEFINE find, assign;
  ...
- CLASS METHODS
  procedure find
    <*(*  Do something, then call parent_find. *)*> is
  begin
    <*(*  something *)*>;
         parent_find;
  end;
- INSTANCE METHODS
  procedure assign
    <*(*  Do something, then call parent_assign. *)*> is
  begin
    <*(*  something *)*>;
         parent_assign;
  end;
```

EXAMPLES OF CLASS SUBSTITUTION, INSTANCE REDIRECTION AND CLASS REDIRECTION

In the following scenarios, SAMPLE_CLASS is an instance and the "x_obj" and "z_obj" attributes have object references to instances of their corresponding type. The double underscore notation is used to qualify a procedure to a class (i.e. "x_find" means the "find" method defined on the "X" class). Referring to FIGS. 9A-9D, examples of class substitution, instance redirection and class redirection will now be described.

Case #1—No Redirection or Class Substitution

Figure 9A:
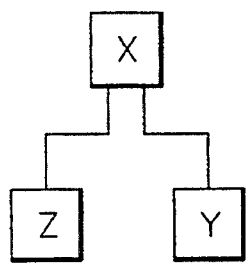
FIGS. 9A-9D illustrate examples of class substitution, instance redirection and class redirection.

Referring to FIG. 9A, Case #1 is schematically illustrated. In Case #1, no redirection or substitution is specified for X, Y, and Z. The execution flow through the "sample" method in SAMPLE_CLASS for Case #1 is as follows:

```
x_obj.find;
                        X_find
z_obj.find;
                        Z_find
                          X_find
CLASS_REF(X).find;
                        X_find
CLASS_REF(Z).find;
                        Z_find
                          X_find
x_obj.assign;
                        X_assign
z_obj.assign;
                        Z_assign
                          X_assign
```

Case #2—Class Substitution

Figure 9B:
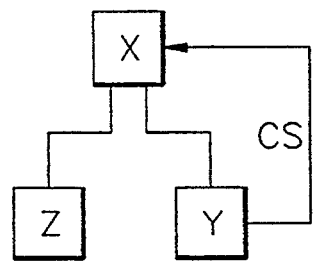

Referring to FIG. 9B, Case #2 schematically illustrates substitution where Y is class substituting for X. The execution flow through the "sample" method in SAMPLE_CLASS for Case #2 is as follows:

```
x_obj.find;
                        Y_find
                          X_find
z_obj.find;
                        Z_find
                          Y_find
                            X_find
```

```
CLASS_REF(X).find;
                        Y_find
                          X_find
CLASS_REF(Z).find;
                        Z_find
                          Y_find
                            X_find
x_obj.assign;
                        Y_assign
                          X_assign
z_obj.assign;
                        Z_assign
                          Y_assign
                            X_assign
```

Case #3—Instance Redirection

Figure 9C:
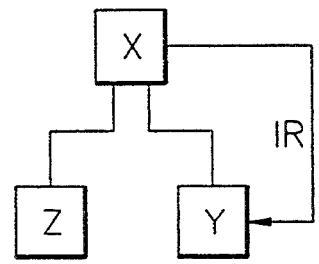

Referring to FIG. 9C, Case #3 schematically illustrates instance redirection where X is instance redirected to Y. The execution flow through the "sample" method in SAMPLE_CLASS for Case #3 is as follows:

```
x_obj.find;
                        Y_find
                          X_find
z_obj.find;
                        Z_find
                          X_find
CLASS_REF(X).find;
                        Y_find
                          X_find
CLASS_REF(Z).find;
                        Z_find
                          X_find
x_obj.assign;
                        Y_assign
                          X_assign
z_obj.assign;
                        Z_assign
                          X_assign
```

Case #4—Class Redirection

Figure 9D:
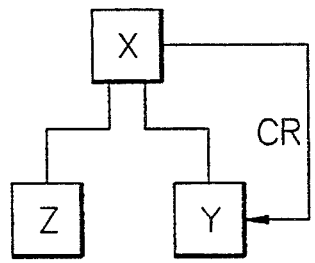

Referring to FIG. 9D, Case #4 schematically illustrates class redirection where Y is class redirecting for X. The execution flow through the "sample" method in SAMPLE_CLASS for Case #4 follows. Note the difference between the instance and class level methods for X, and also the difference between the use of an instance reference versus a class reference to deliver a class level message call.

```
x_obj.find;
                        X_find
z_obj.find;
                        Z_find
                          X_find
CLASS_REF(X).find;
                        Y_find
                          X_find
CLASS_REF(Z).find;
                        Z_find
                          X_find
x_obj.assign;
                        X_assign
z_obj.assign;
                        Z_assign
                          X_assign
```

USES OF CLASS SUBSTITUTION, INSTANCE REDIRECTION AND CLASS REDIRECTION

Class substitution or instance redirect can be used to implement user exits. Rather than having a separate user exit metaclass for which the user modifies source code, the APIs for which a user exit is desired are externalized. The "user exit class" simply inherits from the class with the exposed API, and redefines the method as desired. The programmer then specifies to do either a CS or an IR in the RCI. The choice between CS and IR allows the programmer to decide whether the user exit should apply only to effective instances of the class, or all descendants as well. Implementation of user exits in this manner eliminates the current message call to the no-op user exit methods in exit metaclasses, and also provides an object-oriented implementation.

Event logging, which is implemented in separate subclasses, can also be implemented using class substitution. These classes are class substituted for the corresponding classes for which they are logging.

LINKING CLASSES TOGETHER

As previously noted, the run time object configuration system can also link multiple classes together into a single module resulting in significant performance enhancement. This linking of classes will now be described. The CDT contains a column to specify the class into which this class is linked. The class id of the "linking" class, for any class which is linked into another class, is stored in the class range entry re-using the field previously used for the replacing class id.

The load routine of the fetched module invokes a loaded_classes_entry_point, once for each class linked with it, to set the entry point address in the class range entry for all the other classes. The loaded_classes_entry_point routine is called via a function pointer in the ANCHOR block. The object manager routine to load classes always fetches, and sets up, the primary linked class first. When any request is made to load a class that is linked into another class, the entry point address is immediately available for execution.

CHANGES TO CONTROL BLOCK STRUCTURES FOR A CLASS

The object manager internal control block structures for a class support instance redirection, class redirection, class substitution, and also repeated inheritance at run time. Note that while the corresponding build-time tools must be developed to support build-time repeated inheritance, class substitution can cause repeated inheritance to occur at run-time.

The control block structures of the object manager are dynamic to allow for additional ancestors at runtime, and to allow the order of ancestors to be different from its parent because of repeating ancestors. One of the main features is the design of the ancestor list. The ancestor list is organized into several tables—the "predefined ancestor list", "parent list", "redefined ancestor list", and "ancestor list". A second feature is that all of the control blocks used to resolve message calls are organized into a common large memory block. This optimizes the locality of data to minimize paging faults. To accomplish this, some control blocks are still initialized at build-time in the classes writable static memory space, but are then copied into the common memory block when the class is configured. The System Data Block (SDB) is an example of one of these blocks.

The control blocks for a class are described below.

System Data Block (SDB)

The System Data Block (SDB) represents a class. There is one SDB for each class that has been loaded. Referring to FIG. 10, some of the values in the SDB are as follows:

A pointer 100*a* to, and the size of, the ancestor list.

A pointer 100*b* to, and the size of, the predefined ancestor list.

A pointer 100*c* to, and the size of, the parent list.

A pointer 100*d* to the array of instance data (or attribute) offsets.

A pointer 100*e* to the array of class data (or attribute) offsets.

A pointer 100*f* to, and the size of, the instance frame (this is the default instance frame for the class).

A pointer 100*g* to, and the size of, the class frame.

Flags 100*h* to indicate whether the class has been loaded, loaded+configured, or loaded+configured+materialized.

A pointer 100*i* to the SDB for the class that is class substituting for this class. If none, then it points to itself. If multiple class substitutions are done to the same class, or to the same substituted group of classes, this pointer will always point to the last class substituted.

A pointer 100*j* to the SDB for the class that is instance redirecting for this class. If none, then it points to itself. This pointer will be set up if either a class substitution or instance redirect is done. If multiple instance redirects are done to the same class, this pointer will always point to the last class redirected.

A pointer 100*k* to the SDB for the class that is class redirecting for this class. If none, then it points to itself. This pointer will be set up if either a class substitution, instance redirect, or class redirect is done. If multiple class redirects are done to the same class, this will always point to the last class redirected.

A pointer 100*l* to the "configured" copy of the SDB for this class. This points to itself if this SDB is the configured SDB for a class.

The count 100*m* of the total number of features for all ancestors of this class including itself.

A flag 100*n* to indicate whether a class has failed to configure itself.

A flag 100*p* to indicate whether a class has any security settings specified.

Three flags 100*q*–100*s* to indicate whether this class is class substituting for at least one other class, instance redirecting for at least one other class, and class redirecting for at least one other class.

Ancestor List (ANCL)

The Ancestor List (ANCL) stores information about each ancestor class for a given loaded class. There is one ancestor list for each class that has been loaded. There is one row for each ancestor of the loaded class. The ancestor could have been known about at build-time, or could have been added into the ancestry at run-time. If an ancestor is repeating, it only appears in the ancestor list once, in its designated "primary" position. The last row in the ancestor list is for the loaded class itself. The ANCL anchors information about a descendant, and is used to deliver a message call, and to configure the control blocks for a descendant class.

Each ancestor list entry contains the following information:

The class id of the ancestor.

The security settings for feature numbers from this ancestor class.

Pointer to the block offset array for this ancestor.

Pointer to the block offset entry for this ancestor.

Pointer to a chain of Feature hash index overflow buckets.

Pointer to the instance block.

Size of the instance block.

Pointer to the class block.

Size of the class block.

Pointer to the feature table.

Number of entries in the feature table.

Pointer to the SDB for this ancestor class.

Indicators of whether a separate instance block and class block have been allocated for this ancestor.

A flag to indicate if this ancestor has had changes in its ancestry discovered when configuring this ancestor's ancestor list.

The base index in the ancestor list to the start of ANCL entries for the parent that this entry was inherited under. This value is copied from the parent list value in order to copy it down to descendants.

Predefined Ancestor List (PANCL)

Each class has a list of the ancestors, known as the Predefined Ancestor List (PANCL), used to generate the class at build time. There is one row for each build-time ancestor of the loaded class. The last row in the predefined ancestor list is for the loaded class itself. If build-time tools support repeated inheritance and a repeating ancestor is found, the ancestor will only appear once in the PANCL, under its "primary" parent. The PANCL is used to construct the ANCL when the class is configured, and as an index target for feature hash index values.

Each PANCL entry contains the following information:

The class id of the ancestor.

The class id of the loaded class' parent for this ancestor.

An index into the ANCL to the corresponding entry for this ancestor.

Parent List (PARL)

Each class has a list of its parents, known as the Parent list (PARL), used to generate the class at build time. There is one row for each parent of the loaded class, not including itself. The PARL is used to anchor the loaded class' redefinitions, and to construct the ANCL when configuring a class, by locating the ANCL lists for all parents.

Each PARL entry contains the following information:

The class id of the parent

A pointer to the Redefine Ancestor List (RANCL) for this parent, and the number of entries in the redefine list.

A base index into the ANCL to the set of entries associated with this parent.

Pointer to the SDB for the parent class.

Redefine Ancestor List (RANCL)

The Redefine Ancestor List (RANCL) stores information about the redefinitions by the loaded class for a given ancestor. There is one RANCL for each parent of the loaded class. There is one row for each ancestor of the parent class. The RANCL is used to merge redefinitions into the ancestor information when configuring a class.

Each RANCL entry contains the following information:

The class id of the ancestor.

Pointer to the instance attribute redef table.

Number of entries in the instance attribute redef table.

Pointer to the class attribute redef table.

Number of entries in the class attribute redef table.

Pointer to the feature redef table.

Number of entries in the feature redef table.

The index into the PANCL for the corresponding ancestor entry.

Feature Table (FEAT)

The Feature Table (FEAT) contains information about every feature originally defined in a given class. Each ANCL entry points to one feature table. The feature table has one row for each feature originally defined by this ancestor. Each class that is not a "leaf" node in the inheritance hierarchy will have its feature table copied into the large common memory block for each of its descendants. If the descendant has redefinitions, then they are resolved into its copy of the feature table.

Each row in the feature table has three values:

Whether it is an instance or class feature.

An index into the ANCL to the implementing ancestor for this feature. At build time the initial guess uses the PANCL index value.

The address of the routine that implements this feature.

Feature Redef Table (FRED)

The Feature Redefinition Table (FRED) contains information about redefinitions by the loaded class for features originally defined in a given ancestor class. Each RANCL entry points to one (or zero) FRED. The table has one row for each redefined feature that is originally defined by this ancestor.

Each row has three values:

An index into the ancestor's FEAT for the redefined feature.

A pointer to the routine for the redefined feature.

The index into the loaded class' FEAT for a renamed and redefined feature. This field will contain a flag if there is no rename.

Feature Hash Buckets (FINX)

The Feature Hash Index Overflow Buckets (FINX) are a chain of blocks used to quickly find the correct ancestor entry for a feature number. When a message call is delivered, one of the things that must happen is to find the ancestor entry associated with the feature number. Rather than search the ANCL from top to bottom, a hashing scheme is used to quickly locate the correct ANCL entry.

Each FINX entry contains:

The class id.

The index into the ANCL for the ANCL entry associated with this class id.

A pointer to the next FINX entry in the chain.

Instance Block

The instance block contains the data for the instance attributes defined in a given ancestor. Each ANCL entry points to an instance block for the instance attributes defined in that ancestor. The instance block for a class is reused if the loaded class has no redefinitions from this ancestor. Otherwise a separate copy of the instance block is built for the loaded class to reflect the redefinitions.

Instance Data Offsets (AOFF)

Each class has an Instance Data (or Attribute) Offset Array (AOFF). It is used to locate attributes within the instance block. The SDB and the BOFF point to this array. This array contains one element per instance attribute defined in this class (locally defined, not inherited). For general attribute access by a class, the AOFF is not used. However, the instance data offset array is used by the object manager to access some attributes and to process attribute redefinitions, and is also used for some of the meta-data features, which are described in copending application Ser. No. 08/009,592, to Mitchell et al. filed concurrently herewith and entitled *System and Method for Importing and Exporting Data Between an Object Oriented Computing Environment and an External Computing Environment,* now pending, the disclosure of which is incorporated herein by reference.

Each array element contains two fields:
The size of the attribute.
The offset into the instance block where the attribute is located.

Instance Attribute Redef Table (ARED)

The Instance Attribute Redefinition Table (ARED) contains information about redefinitions by the loaded class for attributes originally defined in a given ancestor class. Each RANCL entry points to one (or zero) instance attribute redefinition tables. The table has one row for each redefined attribute that is originally defined by this ancestor.

Each row has three values:
An index into the ancestor's instance data offset array for the redefined attribute.
A pointer to the redefined initial value for the attribute.
The size of the redefined initial value.

Instance Frame

The instance frame contains all the instance attributes that make up the object. This consists of the instance blocks for all contiguously assembled ancestors. The order of the blocks is the same as the order of ancestors in the ANCL. Each class has a default instance frame pointed to by the SDB.

Class Block

The class block contains the data for the class attributes defined in a given ancestor. Each ANCL entry points to a class block for the class attributes defined in that ancestor. The class block for a class is reused if the loaded class has no redefinitions from this ancestor. Otherwise a separate copy of the class block is built for the loaded class to reflect the redefinitions.

Class Data Offsets (AOFF)

Each class has a Class Data (or Attribute) Offset Array (AOFF). It is used to locate attributes within the class block. The SDB and the BOFF point to this array. This array contains one element per class attribute defined in this class (locally defined, not inherited). For general attribute access by a class, the AOFF is not used. But, the class data offset array is used for some of the meta-data features, and used by the object manager to access some attributes and to process attribute redefinitions.

Each array element contains two fields:
The size of the attribute.
The offset into the class block where the attribute is located.

It should be noted that the AOFF control block is used for both the instance data offsets and the class data offsets.

Class Attribute Redefinition Table (ARED)

The Class Attribute Redefinition Table (ARED) contains information about redefinitions by the loaded class for attributes originally defined in a given ancestor class. Each RANCL entry points to one (or zero) class attribute redefinition tables. The table has one row for each redefined attribute that is originally defined by this ancestor.

Each row has three values:
An index into the ancestor's AOFF for the redefined attribute.
A pointer to the redefined initial value for the attribute.
The size of the redefined initial value.

It should be noted that the ARED control block is used for both the instance attribute redef table and the class attribute redef table.

Class Frame

The class frame contains all the class attributes that make up the object. This consists of the class blocks for all contiguously assembled ancestors. The order of the blocks is the same as the order of ancestors in the ANCL. Each class has one class frame pointed to by the SDB.

Block Offset Entry (BOFF)

The Block Offset Entry (BOFF) is used to save the block offset values for an individual ancestor, so that BOFF arrays can be built for other ancestors.

Block Offset Array (BOFF)

The Block Offset Array (BOFF) is used by a class to address its attributes. Each ANCL entry has one associated BOFF entry, and one associated BOFF array. The BOFF array has one BOFF entry for every build-time ancestor of the ancestor associated with the ANCL entry. The BOFF array is ordered according to the PANCL of the ancestor class. For the loaded class, each PANCL entry has an associated BOFF entry. These BOFF entries are all assembled contiguously to form the BOFF array for the loaded class.

For each ancestor of the loaded class, if the ancestor is not affected by any run-time ANCL changes (i.e. no repeated inheritance or class substitutions were discovered while configuring the class) then the BOFF array for the ancestor is setup to reuse a subset of the BOFF array that was built for the loaded class (since the order of ancestors is identical). If any run-time ANCL changes were discovered that affect this ancestor, then a new BOFF array is allocated for that ancestor, and individual BOFF entries are copied in according to the order in the ancestor's PANCL. When a message call is made, the SYSTEM block points to the BOFF array for the implementing ancestor of the feature. BOFF is further described with respect to attribute addressing via block and attribute offsets.

Each BOFF entry has four values:

The offset into the instance frame to the beginning of the instance block for the ancestor corresponding to this BOFF entry.

The pointer to the instance data offset array for the ancestor corresponding to this BOFF entry.

The offset into the class frame to the beginning of the class block for the ancestor corresponding to this BOFF entry.

The pointer to the class data offset array for the ancestor corresponding to this BOFF entry.

IMPLEMENTATION OF CONTROL BLOCK STRUCTURES

Some of the control block structures described above are defined and initialized by the generated 'C' code for a class. The control block structures are initialized with the following information to support class substitution (CS), instance redirection (IR), and class redirection (CR):

The feature hash index value in the cache SYSTEM variables, that are declared for each kind of message call, is initialized to have the PANCL index value.

For the System data block (SDB): (i) The pointer to the parent list (PARL) and its size, the pointer to the predefined ancestor list (PANCL) and its size, and the pointer to the ancestor list (ANCL) are initialized to point to a single ANCL entry for the generated class; (ii) the substituted by, class redirected to, and instance redirected to fields are all initialized to point at our own SDB; and (iii) the "configured" and "materialized" booleans are both initialized to FALSE.

The instance attribute offset array (AOFF) and class attribute offset array (AOFF) are completely defined.

A feature table (FEAT) is initialized for the features declared in the generated class. The implementing ancestor index is initialized to contain the PANCL index value.

The ancestor table is allocated at run-time.

The parent list (PARL) is initialized. It has one entry for each parent of this class. It does not include the generated class itself. The entries are ordered as a post-order traversal of the inheritance, starting at the generated class. Each entry is initialized to have: (i) the class id of the parent; (ii) the pointer to the redefine ancestor list (RANCL) for the parent; and (iii) the number of entries in the redefine ancestor list (RANCL).

The predefined ancestor list (PANCL) is initialized. It has one entry for each ancestor of this class, including the generated class itself. Each row is initialized to have the class id of the ancestor, and the class id of the associated parent class. The entries are ordered the same as the current code orders the ancestor list (ANCL). Referring to FIG. 11, an example of the ordering of entries in the predefined ancestor list (PANCL) will now be described. If the linked list class in FIG. 11 inherits from frame, list pack, and flattenable, the rows in the predefined list are ordered as (1) Object, (2) Frame, (3) List Pack, (4) Flattenable, and (5) Linked List.

For each parent, a redefine ancestor list (RANCL) is built and completely initialized. Each redefine ancestor list (RANCL) contains a row for each ancestor of the parent, including the parent itself. The ordering of the rows uses the same rules as the PANCL.

Each entry contains:

The class id of the ancestor

A pointer to a table of instance attribute redefine entries for any instance attributes originally declared in this ancestor that have been redefined by this class. The number of redefine table entries is also stored. Each entry in the instance attribute redefine table (if one exists) is completely initialized with the default values of the new instance and class attributes.

Same as above for the table of class attribute redefines.

A pointer to a table of feature redefine entries for any features originally declared in this parent that have been redefined by this class. The number of redefine table entries is also stored. Each entry in the feature redefine table (if one exists) is completely initialized the same as currently done.

The index into the PANCL for the corresponding entry.

For the generated class, one ANCL entry is built and initialized to have:

The class id of the generated class.

A pointer to the feature table, instance and class blocks, and the sizes of each. The instance and class blocks are initialized the same as is currently done.

A pointer to the SDB.

No ANCL entry is setup for all other ancestors in the PANCL.

Figure 12:
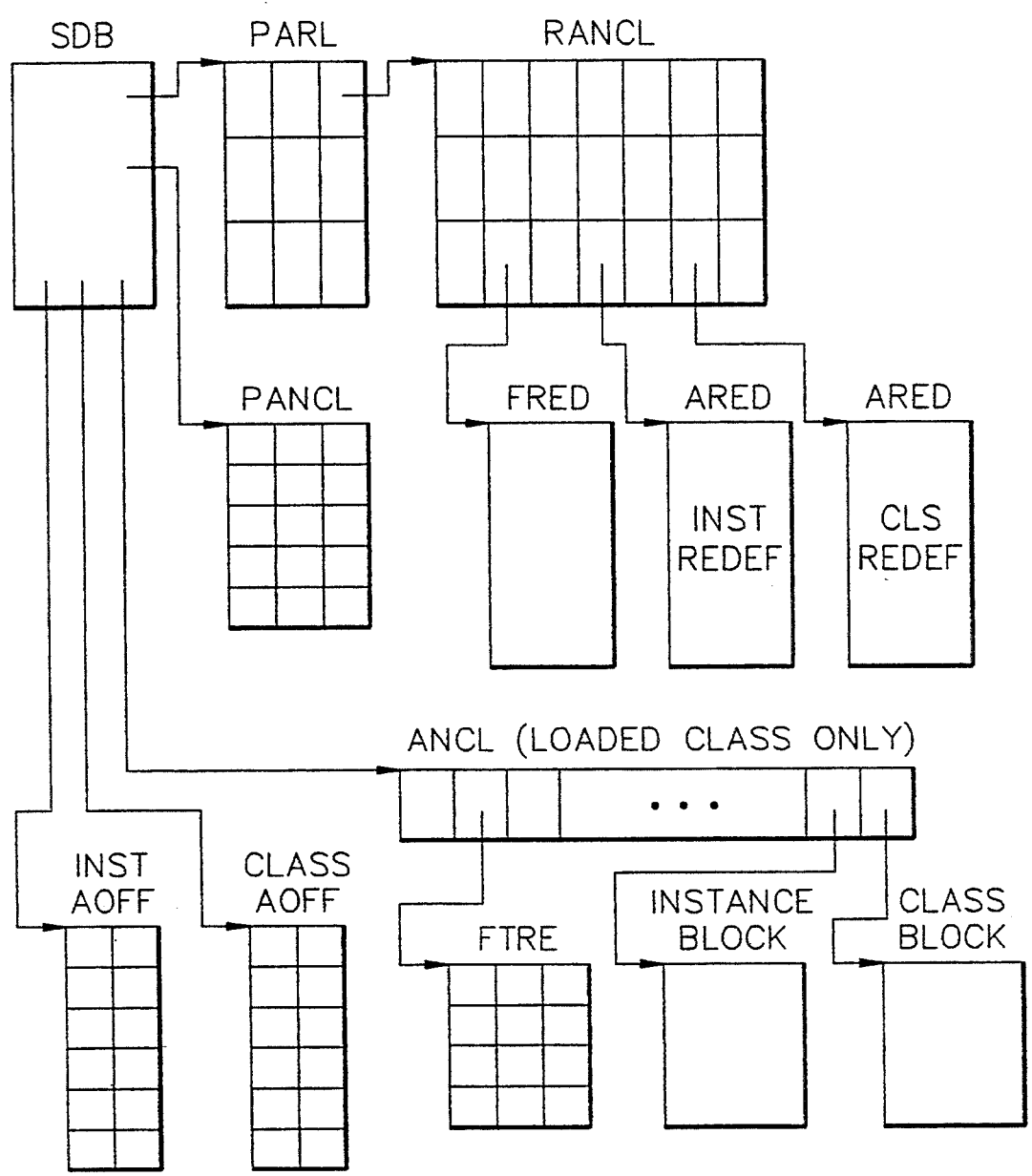
FIG. 12 illustrates a block diagram of control blocks and the operations of the object manager thereon.

The control blocks allocated and initialized at build time are illustrated in FIG. 12. These control blocks, their entries, and the relationship between these control blocks were previously described.

OBJECT MANAGER CHANGES WHEN LOADING A CLASS

Figure 13:
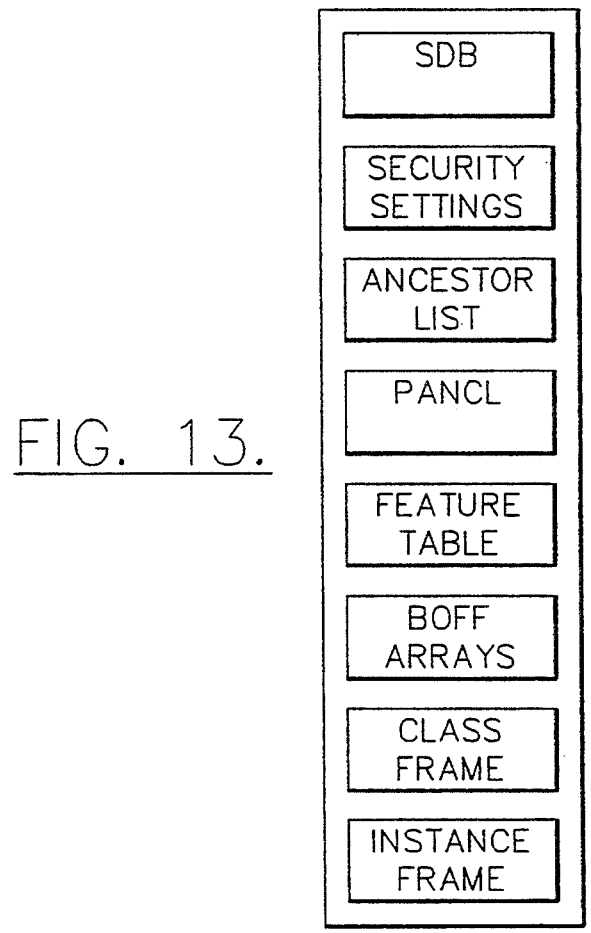
FIG. 13 illustrates the structure of control blocks consolidated by the object manager of FIGS. 4 and 5.

The object manager configures a class at run time by assembling the complete picture for the class, including redirection, substitution, and repeated inheritance. It also consolidates all of the control blocks used by a class to deliver message calls into a common large memory block. This is done to optimize the locality of data to minimize paging activity. Some control blocks are grouped into the common memory block. The control blocks that are grouped into a common memory block are illustrated in FIG. 13 and include SDB, security settings, ancestor list, PANCL, feature table, BOFF, class frame, and instance frame. Other control blocks are located either in writable static memory (initialized at build-time), or dynamically allocated in their own separate memory block.

Resolution of all information relating to redirection, substitution and repeated inheritance by the run time object configuration system according to the present invention and its operation on the control blocks can be segmented into nine phases.

1. Phase 1 computes offset values in the AOFF entries. This is necessary because relative offsets could not be compiled in. The logic loops through the class and instance AOFFs for the loaded class, and subtracts the address of the beginning of the block from the address of the attribute to compute the offset.

2. Phase 2 determines the sizes required for all the sub-blocks (control blocks, tables and data blocks) within the large common block. This is done by looping through the parent list, finding the parent's SDB, and adding up the parents' sizes along with the space needed for the loaded class. Additionally, Phase 2 loops through the first parent's ancestor list and compares it to the PANCL for the loaded class. This is done to search for any run-time changes to the loaded class' ANCL, or any repeating ancestors.

3. Phase 3 resolves the ANCL for the loaded class. If the loaded class has single (or no) inheritance, and Phase 2 did not find any run-time ancestor changes or repeated, then this phase is bypassed. In this case, the ANCL is identical to the parent's ANCL with the loaded class appended to the bottom. Otherwise, a temporary ANCL is allocated and built. Ancestor entries are copied from the parent's ANCL into the temporary ANCL, according to the order in the loaded class' PANCL. Run-time ANCL changes and repeating ancestors are checked for secondary parents, just as Phase 2 did this for single inheritance. If added run-time ancestors are found, they are inserted into the temporary ANCL in the position determined by the loaded class' parent. If a repeating ancestor is found, it is added in the ANCL under its "primary" parent. The primary parent is the build-time parent if the repeating ancestor is in the loaded class' PANCL. If the repeating ancestor is not in the loaded class' PANCL, then the "primary" parent is the first parent under which the ancestor is found.

4. Phase 4 allocates the large common memory block to contain all the class related control blocks. The starting addresses for all the sub-blocks are assigned, and the following sub-blocks are copied into the common memory block.

The SDB is copied, and the LCT pointer is changed to point to this new SDB. The IR, CR, and CS pointers from other class' SDBs are also changed to point to this new SDB.

The ANCL is copied, and the feature tables for each ancestor are copied from either the parent's ANCL, or the temporary ANCL allocated in Phase 3. Then the ancestor entry and feature table for the loaded class are copied.

The PANCL for the loaded class is copied.

Once the starting addresses have been assigned and the sub-blocks copied and if the loaded class has multiple inheritance, the implementing ancestor index in the feature tables is recalculated to account for the base index. This will properly compute the implementing ancestor index if there are no run-time ANCL changes.

5. Phase 5 corrects the implementing ancestor index values in the feature tables if run-time ANCL changes or repeating ancestors were found during Phases 2 and/or 3. This is done by doing a complete search through the ANCL to find the correct index for each entry in all the feature tables.

6. Phase 6 is used to merge the redefinitions into the ANCL. The PARL for the loaded class is processed from top to bottom, and the RANCL for each PARL entry is processed from top to bottom. The redefinitions are merged by looping through the redef table (for either feature, class, or instance), and copying the new values into either the feature table, class block, or instance block. This is straight-forward except for the case of a rename/redefine combination for the feature table.

In a rename/redefine case, the feature address is first copied from the ancestor's feature table entry into the renamed feature of the loaded class' feature table. Then the redefined feature address is copied from the feature redef entry into the ancestor's feature table entry address.

7. Phase 7 is used to build the class and instance frames, and to build the BOFF entry for each ancestor.

For each ancestor entry the class and instance blocks are copied into the class and instance frame.

The current offsets into the class and instance frames are assigned to the BOFF entry for that ancestor, and then incremented by the size of the blocks to be ready for the next ancestor entry.

The instance and class attribute offset list pointers are copied from the ancestor's associated SDB to the block offset entry.

8. Phase 8 is used to set up the BOFF array for each ancestor. The BOFF array must contain all the ancestors that an ancestor class knew about at its build-time. If the loaded class has no run-time ANCL changes or repeating ancestors, then this phase can be completely bypassed because earlier phases setup the BOFF array pointer to reuse the loaded class' BOFF array (offset by the base index). Otherwise, a new BOFF array is built for each ancestor affected by run-time ANCL changes by copying the BOFF entries for each of its build-time ancestors.

9. Phase 9 is used to verify that if the loaded class is a slot class, that its instance size is identical to any other classes that are redirected or substituted by the loaded class. Otherwise an exception is raised.

SETTING UP REDIRECTION

Three routines are available in the Object Manager to specify a class substitution, class redirection, and instance redirection. Pointers to these routines are set up in the ANCHOR block by the object manager class initialization routines.

Redirecting Message Calls

To redirect message calls, the redirecting class is determined when the object reference is established, except in a few cases where CLASS_REF cache variables are initialized prior to the initialization of the system's class substitutions and redirections. For all other cases, no redirection "hooks" need to be made when a message call is issued. If the object reference is a "CLASS" type reference, then redirection will occur in either the "CLASS_REF", "id_to_ref", or "name_to_ref" calls. If the object reference is an "INSTANCE" type reference, then redirection will occur in the "set_object_id" call. Note that the type of redirection, class or instance, is determined by the type of object reference (an "instance" type of object reference or a "class" type of object reference)—not by the message call being either at the class or instance level. Therefore, if class level messages are issued to an instance-type object reference, then instance redirect applies—not class redirect.

For class redirection, the "id_to_ref", "name_to_ref" and "class_ref" routines use the class redirection pointer in the SDB, and set up the class_ref variable with the redirected class. To catch the class_ref that got initialized without redirection, the messenger double-checks for class redirection when a message call is delivered to a class_ref.

For instance redirection, the new SDB pointer in the object reference is used to "hook in" the redirecting class. There is an SDB pointer in all object references. The messenger uses this SDB pointer to resolve the message call. The "set_object_id" routine will put the original class id in the object reference, not the redirecting class id (so as not to cause the database value to change upon update). This routine checks for instance redirection and sets up the SDB pointer to point to the redirecting class' SDB. In addition, the "id_to_ref", "name_to_ref", and "class_ref" routines mentioned above set the SDB pointer in the object reference to high-values if the class has not been loaded. The messenger sets up the SDB pointer in the object reference if it finds high-values. The "class_id" universal feature returns the class id of the redirecting class by using the SDB pointer that was set up in the object reference.

Attribute Addressing Via Block and Attribute Offsets

Figure 14:
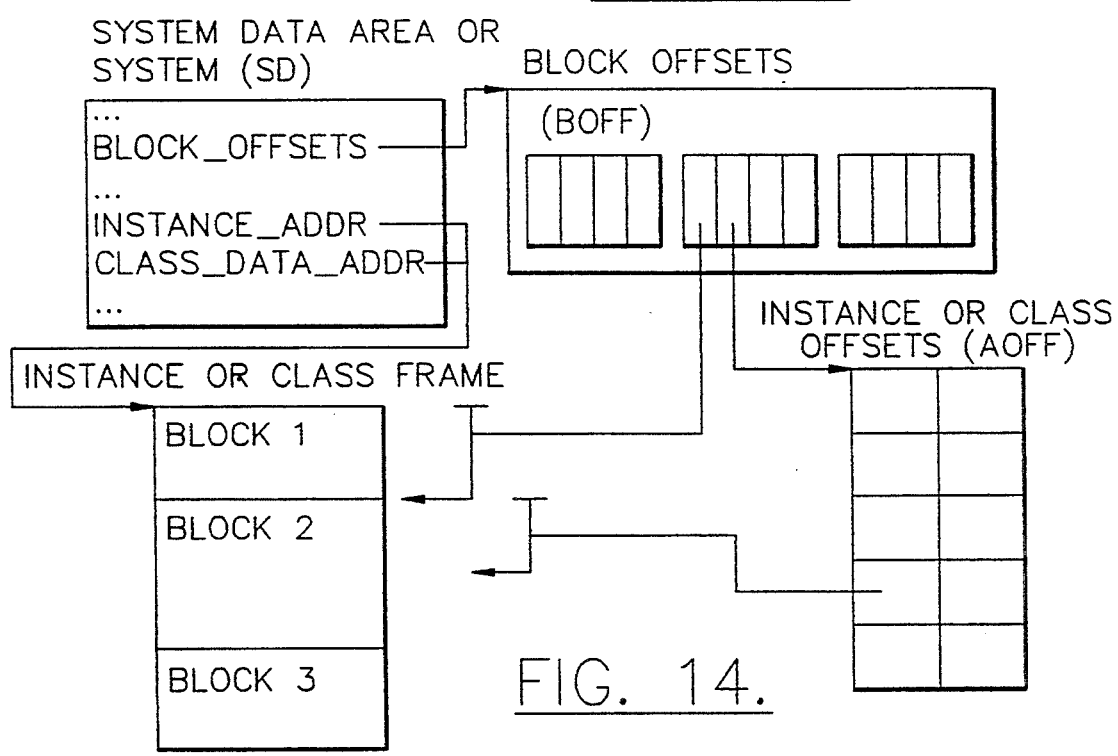
FIG. 14 illustrates an example of attribute operations by the object manager of FIGS. 4 and 5.

The AOFF is used to access attributes for the metadata and to access some attributes from within the object manager. However, the AOFF is not used for general attribute access by a class; rather, block offset is used for that purpose. Following is a description of the block and attribute offset technique used to access attributes. For inherited attributes, the address of the attribute is computed by adding:
Address of the frame +
Block offset for the ancestor +
Instance/class offset for the attribute Referring to FIG. 14, a block diagram example of accessing an attribute using controls is illustrated for a class with three ancestors (including itself) accessing the fourth attribute of its immediate parent.

Resolving Feature Addressing

The feature hash index in SYSTEM will contain a PANCL index. If this feature hash value is correct, the routines address through the ANCL entry to obtain the necessary information. If the feature hash value is not correct, FINX entries are built to index into the ANCL.

The other change is the calculation of the implementing ancestor index. Since repeating ancestors can cause a given ancestor's offset in the ANCL to move around among descendants, the current "base index" technique no longer works. Therefore, the implementing ancestor index is recalculated in every feature table, if necessary, since every class has its own copy of each ancestor's feature table. Then the implementing ancestor index can be copied directly from the feature table to the SYSTEM block.

New Exceptions

The following new exceptions may be raised when an invalid request for class substitution, instance redirection, or class redirect is received. The CSR_INVALID_SLOT_INST_SIZE exception can also be raised when configuring a slot class since the instance size is not determined until then.

```
#define CSR_RESERVED_CLASS          (long) (−2028)
/* An attempt was made to class substitute, instance
   redirect, or class redirect either the EKNMTSEC or
   EKNOTRM class. These two classes cannot be class
   substituted or redirected. */
#define CSR_ALREADY_CONFIGURED      (long) (−2029)
/* An attempt was made to class substitute, instance
   redirect, or class redirect a class that has
   already been configured. This should only occur if
   an attempt is made to call the class substitution,
   or either redirection routines from somewhere other
   than the RCI. */
#define INVALID_INST_REDIRECT       (long) (−2031)
/* An attempt was made to instance redirect a slot
   class. Slot classes can only be class substituted
   or class redirected. */
#define CSR_INVALID_SLOT_INST_SIZE  (long) (−2032)
/* An attempt was made to class substitute or class
   redirect a slot class, but the instance sizes of
   the two classes involved are not equal. For slot
   classes to be class substituted or class
   redirected, the instance sizes must be
   identical.*/
#define CSR_INVALID_ANCESTRY        (long) (−2033)
/* An attempt was made to class substitute, instance
   redirect, or class redirect, but the
   substituting/redirecting class does not have the
   substituted/redirected class as an ancestor. */
```

SECURITY

The object manager is also responsible for establishing security settings. It checks to see whether security settings have been set. If none have been set and if this class is instance redirecting another class, the security settings from the instance redirected class are copied. If the class is instance redirecting multiple other classes, then the security settings are copied from the instance redirected class which is the nearest ancestor that has security settings specified. This sets up the class permitting the object manager to check the appropriate security settings.

MULTIPLE COMBINATIONS OF REDIRECTION AND SUBSTITUTION

RCI utilizes a set of interfaces to specify redirection and substitution. Multiple combinations of redirections and substitutions can be specified. Rules for what can be specified are as follows:
Substitution and redirection are processed in the following order:
1. class substitutions (CS)
2. instance redirects (IR)
3. class redirects (CR)
A class substitution must be a descendant of the class being substituted for. After the substitution, both classes are effectively one-and-the-same in the hierarchy. If another class substitution is done to the current substituting class, then both classes are effectively substituted to the new substituting class. If another class substitution is done to a class which is already substituted, then the new substituting class must be a descendant of the current substituting class. In this case the new class substitution applies to both the previous substituted and substituting classes. Also, a class may substitute multiple times in the hierarchy. The same class may be used to substitute for two different classes, as long as both substituted classes are ancestors of the substituting class.

Referring to FIGS. 15–19, examples of multiple combinations of redirection and substitution are illustrated. They will now be described.

Examples—Multiple Class Substitutions

Figure 15A:
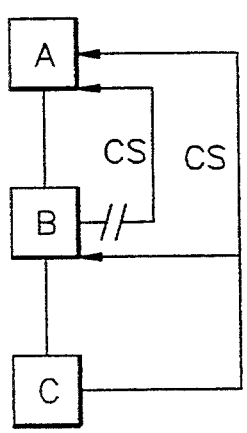
FIGS. 15A-15C, 16, 17A-17B, 18 and 19 illustrate examples of multiple combinations of class substitution, instance redirection and class redirection.

Referring to FIG. 15A, an example of multiple class substitutions is illustrated. In this example, B inherits from A and C inherits from B. A is being class substituted by B. Then another class substitution is performed to substitute C for A. This is allowed since C is a descendant of B. This causes both A and B to be substituted by C.

Figure 15B:
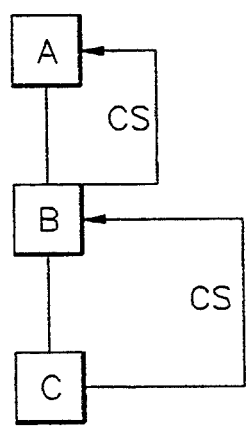

Referring to FIG. 15B, a second example of multiple class substitutions is illustrated. In this example, B inherits from A and C inherits from B. A is being class substituted by B, and B is being class substituted by C. This is allowed, and effectively substitutes both A and B with C. Therefore, both of the examples illustrated in FIGS. 15A and 15B have the same result.

It should be noted that class substitution may become incompatible in the following scenario: (i) assume we have an existing class substitution running; and (ii) assume another class appears which class substitutes for the same class substituted in step (i). If the old class attempts to enable class substitution (CS) on top of this, the CS will not load because the class is not a descendant of the new CS from step (i).

Figure 15C:
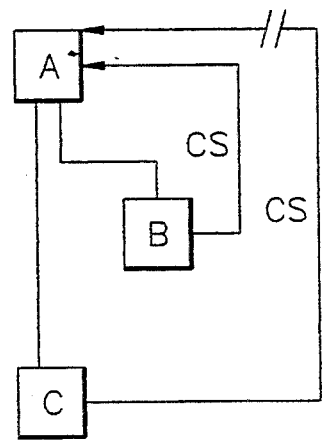

Referring to FIG. 15C, an example of an invalid multiple class substitution is illustrated. In this example, B inherits from A and B is class substituting for A. C also inherits from A. Since C is not a descendant of B, C cannot class substitute for either B or A. If C was a descendant of B, then this structure would be allowed.

Example—Class Substitution/Instance Redirect Combination

When an instance redirect (IR) is done, the class being redirected "to" (second class) must be a descendant of the class being redirected "from" (first class). Note that slot classes cannot be instance redirected, they can only be class redirected. Also, a class may be redirecting for multiple other classes in the hierarchy. The same class may be used to redirect from two different classes. If class substitutions were already done to the redirected "from" class, the redirected "to" class automatically picks up the additional ancestors at run-time. This is because the redirected "to" class does not have to be a descendant of the last class substituted for the redirected "from" class—only the original redirected "from" class. Also, both the substituted and substituting classes will be instance redirected.

Figure 16:
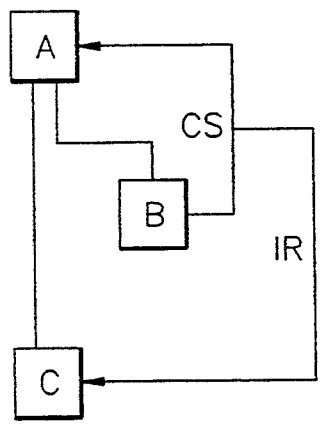

Referring to FIG. 16, an example of implementation of an instance redirect performed on top of a class substitution is illustrated. In this example, B inherits from A and B is class substituting for A. C also inherits from A. The A class is being instance redirected to C. This structure is allowed and causes both A and B to be instance redirected to C.

Example—Multiple Instance Redirects

If multiple instance redirects are done to the same class, then each subsequent redirect class must be a descendant of each preceding class that was redirected "to". If an instance redirect is done to a class that is itself instance redirecting another class, then both of these last two classes are redirected to the new class.

Figure 17A:
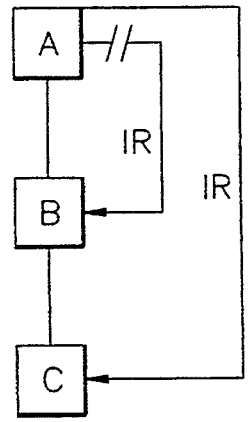

Referring to FIG. 17A, an example of multiple instance redirect is illustrated. In this example, B inherits from A and C inherits from B. A is being instance redirected to B, then another instance redirect is done from A to C. This is allowed since C is a descendant of B. This also negates the A to B redirection.

Figure 17B:
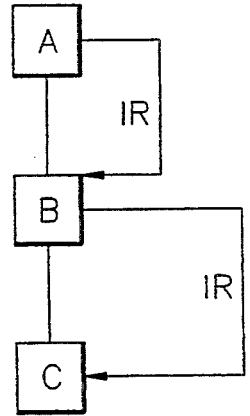

Referring to FIG. 17B, a second example of multiple instance redirect is illustrated. In this example, B inherits from A and C inherits from B. A is being instance redirected to B and B is being instance redirected to C. This is allowed, and effectively redirects both A and B to C.

It should be noted that if an IR is added to a new class from an existing class that has already been substituted or redirected (call the current substituting or redirecting class the "customized class"), a scenario similar to the one described above for invalid multiple class substitution arises. In these situations several options exist to maximize flexibility:

If the current customized class is using IR, the new class can be added using CS so that the new ancestor is automatically picked up at run-time.

If the current customized class is using CS, the new class can be added using IR, so that the new class automatically picks up the current customized class as a new ancestor.

Neither CS nor IR can be used for the new class while continuing to run the current customized class using the original code. The new class will then only be used by clients who have specifically coded to the new class.

The current customized class can be modified to inherit from the new class. This will allow CS or IR specifications to be stacked.

Example—Instance Redirect/Class Redirect Combination

The rules for class redirects are the same as for instance redirects with the following additions. If a class being redirected "from" has already had an instance redirect performed, then the class being redirected "to" must be a descendant of the instance redirect class.

Figure 18:
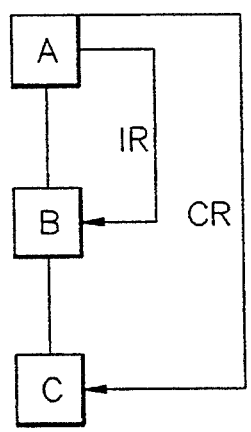

Referring to FIG. 18, an example of implementation of class redirect performed on top of instance redirect is illustrated. In this example, B inherits from A and C inherits from B. A is being instance redirected to B, and then a class redirect is done from A to C. This is allowed since C is a descendent of B. Both redirections are enabled.

Example—Circular Inheritance

Figure 19:
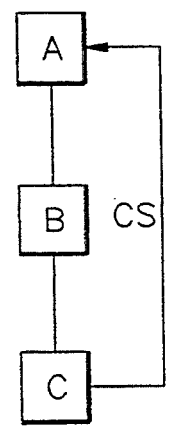

Note that class substitution does not affect the classes along the inheritance line from the substituting class back to the substituted class. This prevents a "Circular Inheritance" situation from occurring. Referring to FIG. 19, an example of circular inheritance is illustrated. If C inherits B, B inherits A and C class substitutes for A, then it would appear that B would inherit back to C that inherits B that inherits C, etc.

To avoid confusion like this, the substitution is ignored along the inheritance path from the substituting class back to the substituted class. Accordingly, the C-B-A inheritance path ignores all of the substitution that has been performed. In fact, the B class is totally unaffected by C substituting A, and, in any event, C would have to substitute B to affect it in any way.

Considering the simple case of B substituting A, class A, in effect, disappears and only B remains (except that A is an ancestor of B). Any name clashes that might have existed if C actually inherited from B instead of A, will not affect the run-time because names do not exist at run-time. The only exception is the meta-data. In this case an exception will be raised and the class will not be loaded, if either of the attributes with the same name are importable, exportable, or class retrievable. Name clashes introduced because of inheritance are ignored in all other cases. Importing, exporting, and metadata are described in copending application Ser. No. 08/009,592, to Mitchell et al. filed concurrently herewith and entitled *System and Method for Importing and Exporting Data Between an Object Oriented Computing Environment and an External Computing Environment*, now pending, the disclosure of which is incorporated herein by reference.

INTERFACES FOR CLASS SUBSTITUTION AND REDIRECTION

Following are interfaces to the routines that implement class substitution and redirection.

```
METHOD NAME:        class_substitution
DESCRIPTION:
    This method adds a new class substitution to
    the class hierarchy.
NOTES:

extern void    class_substitution   (EKNOSAB *ANCHOR,
                                     long  orig_cls_id,
                                     long  subst_cls_id);
```

```
METHOD NAME:        instance_redirect
DESCRIPTION:
    This method adds an instance redirection to
    the class hierarchy.
NOTES:

extern void    instance_redirect    (EKNOSAB *ANCHOR,
                                     long  orig_cls_id,
                                     long  redirect_cls_id);
```

```
METHOD NAME:        class_redirect
DESCRIPTION:
    This method adds a class redirection to the
    class hierarchy.
NOTES:

extern void    class_redirect       (EKNOSAB *ANCHOR,
                                     long  orig_cls_id,
                                     long  redirect_cls_id);
```

Following are the interfaces to the routines that are used to facilitate the processing of class substitution and redirection.

```
METHOD NAME:        IR_to_orig
DESCRIPTION:
    Return a linked list of all the instance
    redirected class IDs for a given instance
    redirecting class ID. If the class ID
    passed in is not instance redirecting
    another class, then a VOID list is returned.
    If multiple instance redirected classes are
    found, they are ordered in the list
    according to their proximity in the
    ancestry of the instance redirecting
    class passed in. The nearest ancestor
    of the instance redirecting class is
    first, followed by the next nearest
    ancestor, and so on.
NOTES:

extern LINK_LIST_CLS  ir_to_orig (
             EKNOSAB * ANCHOR,
             long     IR_Class_ID );
```

```
METHOD NAME:        Name_To_ID
DESCRIPTION:
    This method returns the class ID of the
    class with the given member name.
NOTES:

extern long name_to_id (
             EKNOSAB * ANCHOR,
             char * Name );
```

```
METHOD NAME:        Name_To_Ref_Nordct
DESCRIPTION:
    This method returns the object reference of
    the class with the given member name. The
    object reference will bypass any instance or
    class redirection that was set up.
NOTES:
    To do this, the object reference is set up
    as a slot reference even though it is
    intended to be used as a class reference
    by the caller. The caller should not attempt
    to pass an instance message using this oref,
    as a valid instance has not been set up.
    This routine is not intended for general use.
    It should only be used by a few routines in
    the app model when displaying/updating
    values defined for a class.

extern OBJECT_REFERENCE name_to_ref_nordct (
             EKNOSAB * ANCHOR,
             char * Name );
```

```
METHOD NAME:        orig_to_CR
DESCRIPTION:
    Return the class redirecting class ID given
    a class ID. If the class ID passed in is
    not being class redirected, then pass it
    back to the caller as the return value.
NOTES:

extern long orig_to_cr (
             EKNOSAB * ANCHOR,
             long     orig_Class_ID );
```

```
METHOD NAME:        orig_to_IR
DESCRIPTION:
    Return the instance redirecting class ID
    given a class ID. If the class ID passed in
    is not being instance redirected, then pass
    it back to the caller as the return value.
NOTES:

extern long orig_to_ir (
             EKNOSAB * ANCHOR,
             long     orig_Class_ID );
```

```
METHOD NAME:        Secured_Feature
DESCRIPTION:
    This method indicates whether or not the
    security setting for a given method number
    and a given class is currently set.
NOTES:

extern char secured_feature (
             EKNOSAB * ANCHOR,
             long Class_ID,
             long Method_Number );
```

Following is a sample listing of the routine that initializes all the classes in the run-time system. This routine specifies all of the CR, IR, and CS relationships between classes.

```
MODULE NAME:        RCI
DESCRIPTIVE NAME:   CLASS INIT
DESCRIPTION:
    This module initializes the set of valid
    classes in the system. This module is
    invoked by the object manager after the
    ANCHOR block has been set up and after the
    EKNOCRTM address has been set in the ANCHOR
    block. This module initializes the set of
    valid classes by creating a linked list of
    class ranges off of the EKNOCRTM. Each
    class range has an array of entries for
    specific classes. Each entry contains the
    number of the class, the short name of the
    class, and two reserved fields. The entries
    within each class range must be ordered by
    different class number. Class numbers in
``` class ranges are allowed to overlap, but no
two entries should ever have the same class
number. This module also initializes all
class substitutions, instance redirections,
and class redirections between classes.
NOTES:

--- pragma linkage (init,fetchable)

METHOD NAME:     init
DESCRIPTION:
    This method calls the three separate
    routines to initialize the set of valid
    classes. First, the class_init routine is
    called to initialize the set of classes in
    the system.
    After the set of valid classes has been
    initialized, four separate routines are
    called to allow class substitution, instance
    redirection, and class redirection to be
    specified.
NOTES:

---

```
static void init (EKNOSAB *ANCHOR)
{
    Initialize the set of valid classes
    class_init (ANCHOR);
    * Specify the class substitutions
    cls_subst (ANCHOR);
    * Specify the instance redirections
    inst_redirect (ANCHOR);
    Specify the class redirects
    cls_redirect (ANCHOR);
}
```

METHOD NAME:     cls_subst
DESCRIPTION:
    This method allows for classes to be class
    substituted into the inheritance hierarchy
    for one of their ancestor classes.
NOTES:
    The class substitution option of the system is
    used to insert a class into the inheritance
    hierarchy at run-time. If class "B" (the
    substituting class) is substituted for class
    "A" (the substituted class), then all objects
    of type "A" will now be treated as type "B".
    Also, all descendant classes of "A" will now
    have class "B" inserted into their ancestry at
    run-time. When a class substitution is done,
    the substituting class (class "B") will
    automatically be set up as the instance
    redirecting, and class redirecting class for
    the substituted class (class B"). Refer to the
    "cust inst redirect" and "cust cls_redirect"
    methods for more information.

---

```
static void cls_subst (EKNOSAB *ANCHOR)
{
    Code can be placed here to do class
    substitution. The CLASS_SUBSTITUTION macro
    should be used for every class that is be
    substituted. A class can only be substituted
    by one of its descendants, and an exception will
    be raised if an invalid class substitution
    request is made. An invalid class substitution
    may result in one of the following exceptions:
        INVALID_CLASS_ID
        CSR_RESERVED_CLASS
        CSR_INVALID_SLOT_INST_SIZE
        CSR_INVALID_ANCESTRY
    Example :
    To class substitute EKNXLLST for EKNOFRM,
        CLASS_SUBSTITUTION (EKNOFRM,
    EKNXLLST);
            or
        CLASS-SUBSTITUTION (1, 33);
    The first call requires including the EKNOFRM
    and EKNXLLST headers to get the EKNOFRM and
    EKNXLLST #define values.
}
```

METHOD NAME:     inst_redirect
DESCRIPTION:
    This method allows for classes to be instance
    redirected to one of their ancestor classes.
NOTES:
    The instance redirect option of the system is
    used so that message calls that are going to a
    class (the redirected class) will be redirected
    to a descendant class (the redirecting class).
    This is possible due to the dynamic binding
    naturally associated with object oriented
    programming. The instance redirected class
    must still be left in the system to allow
    descendants to inherit features from it.
    When an instance redirect is specified, the
    redirecting class will also be set up as the
    class redirecting class for the redirected
    class. Refer to "cust_cls_redirect" for more
    information. If class "B" is instance
    redirecting for class "A", then any objects of
    class "A" that are materialized will be treated
    as type "B". Since a class redirect is also
    done, any calls to the create method will
    also be redirected to class "B". So, all new
    objects, and all existing objects will both be
    treated as class "B". However, descendants of
    the redirected class are not affected by the
    instance redirection.

---

```
static void inst_redirect (EKNOSAB *ANCHOR)
{
    Code can be placed here to do instance
    redirection. The INSTANCE_REDIRECT macro should
    be used for every class that is be redirected.
    A class can only be redirected to one of its
    descendants, and an exception will be raised
    if an invalid instance redirect request is
    made. An invalid instance redirection may
    result in one of the following exceptions:
        INVALID_CLASS_ID
        CSR_RESERVED_CLASS
        CSR_INVALID_INST_REDIRECT
        CSR_INVALID_ANCESTRY
    Example :
    To instance redirect EKNOFRM to EKNXLLST,
        INSTANCE_REDIRECT (EKNOFRM,
    EKNXLLST) ;
            or
        INSTANCE_REDIRECT (1, 33) ;
    The first call requires including the EKNOFRM
    and EKNXLLST headers to get the EKNOFRM and
    EKNXLLST #define values.
}
```

METHOD NAME:     cls_redirect
DESCRIPTION:
    This method allows for classes to be class
    redirected to one of their ancestor classes.
NOTES:
    The class redirect option of the system is used
    so that message calls that are going to a class
    (the redirected class) will be redirected to a
    descendant class (the redirecting class).
    This is possible due to the dynamic binding
    naturally associated with object oriented
    programming. The redirected class must still
    be left in the system to allow its descendants
    to inherit features from it. Class redirect is
    functionally the same as the class replacement
    feature of the Version 1 Release 1 system.
    When using class redirection, only message calls
    to class features are rerouted to there
    directing class. Message calls to instance
    features will be directed to the class of the
    instance used in the message call. So already
    existing instances of the redirected class that
    are stored in the database will not be treated
    as instances of the redirecting class, they will
    still be treated as instances of the redirected
    class. However, any create calls will
    be rerouted to the redirecting class, since
    create is a class feature. Thus all new
    instances will be of the redirecting class. So
    instances of the redirected class and the
    redirecting class can co-exist in the system at
    the same time and both will function as
    determined by their classes. To redirect -continued

```
    message calls to existing object instances, the
    instance redirect option should be used.
    Descendant classes of the redirected class are
    not affected by class redirection.
static void cust_cls_redirect (EKNOSAB *ANCHOR)
    Code can be placed here to do class
    redirection. The CLASS_REDIRECT macro should
    be used for every class that is be redirected.
    A class can only be redirected to one of its
    descendants, and an exception will be raised
    if an invalid instance redirect request is
    made. An invalid class redirection may
    result in one of the following exceptions:
        INVALID_CLASS_ID
        CSR_RESERVED_CLASS
        CSR_INVALID_SLOT_INST_SIZE
        CSR_INVALID_ANCESTRY
    Example :
        To class redirect EKNOFRM to EKNXLLST,
        CLASS_REDIRECT (EKNOFRM, EKNXLLST);
        or
        CLASS_REDIRECT (1, 33);
    The first call requires including the EKNOFRM
    and EKNXLLST headers to get the EKNOFRM and
    EKNXLLST #define values.
}
```

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for configuring objects during execution of an object oriented computing environment on a computing platform comprising:

a computing platform;

a plurality of objects residing on said computing platform each including an object frame containing data attributes and at least one object method for performing actions on the associated object, said objects being arranged in a hierarchy of object classes to define parent and child classes such that child classes inherit the data attributes and methods of parent classes;

a plurality of instances residing on said computing platform, each associated with an object and each containing data related to a corresponding attribute of the associated object;

an object manager executing on said computing platform for sending object messages to said objects to perform actions on the associated object frame using the associated object methods, and for sending instance messages to said instances to perform actions on the associated instance frame using the associated object methods;

a plurality of pointers stored on said computing platform, including pointers to first object classes from which class messages are redirected and corresponding pointers to second object classes to receive and process a redirected class message from the corresponding first object class, and including pointers to third object classes from which instance messages are redirected and corresponding pointers to fourth object classes to receive and process a redirected instance message from the corresponding third object class;

class redirecting means, executing on said computing platform and responsive to a class message which is sent by said object manager executing on said computing platform to one of said first object classes during execution of said object oriented computing environment on said computing platform, and responsive to said plurality of stored pointers, for redirecting said class message which is sent to said one of said first object classes, to the corresponding one of said second object classes; and instance redirecting means, executing on said computing platform and responsive to an instance message which is sent by said object manager executing on said computing platform to one of said third object classes during execution of said object oriented computing environment on said computing platform, and responsive to said plurality of stored pointers, for redirecting said instance message which is sent to said one of said third object classes to the corresponding one of said fourth object classes.

2. A method for configuring objects during execution of an object oriented computing environment on a computing platform, said object oriented computing environment including a plurality of objects residing on said computing platform each including an object frame containing data attributes and at least one object method executing on said computing platform for performing actions on the associated object, said objects being arranged in a hierarchy of object classes to define parent and child classes such that child classes inherit the data attributes and methods of parent classes, said object oriented computing environment further including a plurality of instances residing on said computing platforms, each associated with an object and each containing data related to a corresponding attribute of the associated object, said object oriented computing environment further including an object manager executing on said computing platform for sending object messages to said objects to perform actions on the associated object frame using the associated object methods, and for sending instance messages to said instances to perform actions on the associated instance frame using the associated object methods, said object configuring method comprising the following steps which are performed by said computing platform during execution of said object oriented programming environment on said computing platform:

storing pointers to first object classes from which class messages are redirected and corresponding pointers to second object classes to receive and process a redirected class message from the corresponding first object class;

storing pointers to third object classes from which instance messages are redirected and corresponding pointers to fourth object classes to receive and process a redirected instance message from the corresponding third object class;

redirecting a class message which is sent to one of said first object classes, to the corresponding one of said second object classes, in response to receipt of a class message which is sent by said object manager executing on said computing platform to said one of said first object classes during execution of said object oriented computing environment on said computing platform; and redirecting an instance message which is sent to one of said third object classes to the corresponding one of said fourth object classes in response to receipt of an instance message which is sent by said object manager executing on said computing platform to said one of said third object classes during execution of said object oriented computing environment on said computing platform.

3. A method for configuring objects in an object oriented computing environment on a computing platform, said object oriented computing environment including a plurality of objects residing on said computing platform, each having an object identifier and each including an object frame containing data attributes and at least one object method executing on said computing platform for performing actions on the associated object, said objects being arranged in a hierarchy of object classes to define parent and child classes such that child classes inherit the data attributes and methods of parent classes, said object oriented computing environment further including a plurality of instances residing on said computing platform, each associated with an object and each having an instance frame containing data related to a corresponding attribute of the associated object, said object oriented computing environment further including an object manager executing on said computing platform for sending class messages to said objects to perform actions on the associated object frame using the associated object methods, and for sending instance messages to said instances to perform actions on the associated instance frame using the associated object methods, said object oriented computing environment further including a plurality of system data blocks residing on said computing platform, each associated with an object class and each including an instance redirecting pointer for identifying a system data block associated with a child class of the object class, and a plurality of object references residing on said computing platform, each associated with an object, and each including an instance identifying pointer for identifying an instance of the corresponding object, and a system data block pointer for identifying the system data block of the class of said instance for the corresponding object, said object configuring method comprising the following steps which are performed by said computing platform during execution of said object oriented programming environment on said computing platform:

setting the instance redirecting pointer in the system data block of a first parent class to identify the system data block associated with a first child class, in response to an instance redirect request to redirect said first parent class to said first child class;

obtaining the associated instance redirecting pointer from the system data block for said first parent class;

obtaining the associated object identifier for said first parent class;

storing the obtained instance redirecting pointer in the instance identifying pointer of the object reference of said first child class;

storing the obtained object identifier in the system data block pointer of the object reference of said first child class;

obtaining the instance redirecting pointer and the object identifier from the object reference of said first child class, in response to an instance message which is directed to said first parent class;

responding to said instance message using the obtained instance redirecting pointer and object identifier;

obtaining the instance redirecting pointer and the object identifier from an object reference to the parent class other than said first parent class; and responding to said instance message using the obtained instance redirecting pointer and the object identifier to the parent class other than said first parent class.

4. A method for configuring objects during execution of an object oriented computing environment on a computing platform, said object oriented computing environment including a plurality of objects residing on said computing platform each including an object frame containing data attributes and at least one object method executing on said computing platform for performing actions on the associated object, said objects being arranged in a hierarchy of object classes to define parent and child classes such that child classes inherit the data attributes and methods of parent classes, said object oriented computing environment further including a plurality of instances residing on said computing platform, each associated with an object and each containing data related to a corresponding attribute of the associated object, said object oriented computing environment further including an object manager executing on said computing platform for sending object messages to said objects to perform actions on the associated object frame using the associated object methods, and for sending instance messages to said instances to perform actions on the associated instance frame using the associated object methods, said object configuring method comprising the following steps which are performed by said computing platform during execution of said object oriented programming environment on said computing platform:

storing pointers to first object classes from which class messages are redirected and corresponding pointers to second object classes to receive and process a redirected class message from the corresponding first object class;

storing pointers to third object classes from which instance messages are redirected and corresponding pointers to fourth object classes to receive and process a redirected instance message from the corresponding third object class;

verifying that said second object class is a child of said first object class;

redirecting a class message which is sent to one of said first object classes, to the corresponding one of said second object classes, in response to receipt of a class message which is sent by said object manager executing on said computing platform to said one of said first object classes during execution of said object oriented computing environment on said computing platform, only if said corresponding one of said second object classes is a child of said corresponding one of said first object classes; and redirecting an instance message which is sent to one of said third object classes to the corresponding one of said fourth object classes in response to receipt of an instance message which is sent by said object manager executing on said computing platform to said one of said third object classes during execution of said object oriented computing environment on said computing platform.

5. A system for configuring objects in an object oriented computing environment comprising:

a computing platform;

a plurality of objects residing on said computing platform, each having an object identifier and each including an object frame containing data attributes and at least one object method for performing actions on the associated object, said objects being arranged in a hierarchy of object classes to define parent and child classes such that child classes inherit the data attributes and methods of parent classes;

a plurality of instances residing on said computing platform, each associated with an object and each having an instance frame containing data related to a corresponding attribute of the associated object;

an object manager executing on said computing platform for sending class messages to said objects to perform actions on the associated object frame using the associated object methods, and for sending instance messages to said instances to perform actions on the associated instance frame using the associated object methods;

a plurality of system data blocks residing on said computing platform, each associated with an object class and each including an instance redirecting pointer for identifying a system data block associated with a child class of the object class;

a plurality of object references residing on said computing platform, each associated with an object, and each including an instance identifying pointer for identifying an instance of the corresponding object, and a system data block pointer for identifying the system data block of the class of said instance for the corresponding object;

run time initialization means, executing on said computing platform and responsive to an instance redirect request to redirect a first parent class to a first child class, for setting the instance redirecting pointer in the system data block of said first parent class to identify the system data block associated with said first child class;

set object identification means, executing on said computing platform and responsive to said run time initialization means executing on said computing platform, for obtaining the associated instance redirecting pointer from the system data block for said first parent class, and for obtaining the associated object identifier for said first parent class, and for storing the obtained instance redirecting pointer in the instance identifying pointer of the object reference of said first child class and for storing the obtained object identifier in the system data block pointer of the object reference of said first child class;

means, executing on said computing platform and responsive to an instance message which is directed to said first parent class, for obtaining the instance redirecting pointer and the object identifier from the object reference of said first child class, and for responding to said instance message using the obtained instance redirecting pointer and object identifier of said first child class; and means, executing on said computing platform and responsive to an instance message which is directed to a parent class other than said first parent class, for obtaining the instance redirecting pointer and the object identifier from an object reference to the parent class other than said first parent class, and for responding to said instance message using the obtained instance redirecting pointer and object identifier to the parent class other than said first parent class.

6. A system for configuring objects during execution of an object oriented computing environment on a computing platform, comprising:

a computing platform;

a plurality of objects residing on said computing platform, each including an object frame containing data attributes and at least one object method for performing actions on the associated object, said objects being arranged in a hierarchy of object classes to define parent and child classes such that child classes inherit the data attributes and methods of parent classes;

a plurality of instances residing on said computing platform, each associated with an object and each containing data related to a corresponding attribute of the associated object;

an object manager executing on said computing platform for sending object messages to said objects to perform actions on the associated object frame using the associated object methods, and for sending instance messages to said instances to perform actions on the associated instance frame using the associated object methods;

a plurality of pointers stored on said computing platform, including pointers to first object classes from which class messages are redirected and corresponding pointers to second object classes to receive and process a redirected class message from the corresponding first object class, and including pointers to third object classes from which instance messages are redirected and corresponding pointers to fourth object classes to receive and process a redirected instance message from the corresponding third object class;

class redirecting means, executing on said computing platform and responsive to a class message which is sent by said object manager executing on said computing platform to one of said first object classes during execution of said object oriented computing environment on said computing platform, and responsive to said plurality of stored pointers, for redirecting said class message which is sent to said one of said first object classes, to the corresponding one of said second object classes;

instance redirecting means, executing on said computing platform and responsive to an instance message which is sent by said object manager executing on said computing platform to one of said third object classes during execution of said object oriented computing environment on said computing platform, and responsive to said plurality of stored pointers, for redirecting said instance message which is sent to said one of said third object classes to the corresponding one of said fourth object classes; and means, executing on said computing platform, for verifying that said second object class is a child of said first object class;

wherein said class redirecting means is further responsive to said verifying means for redirecting said class message which is sent to said one of said first object classes, to the corresponding one of said second object classes only if said corresponding one of said second object classes is a child of said corresponding one of said first object classes.

7. A system for configuring objects during execution of an object oriented computing environment on a computing platform comprising:
- a computing platform;
- a plurality of objects residing on said computing platform, each including an object frame containing data attributes and at least one object method for performing actions on the associated object, said objects being arranged in a hierarchy of object classes to define parent and child classes such that child classes inherit the data attributes and methods of parent classes;
- a plurality of instances residing on said computing platform, each associated with an object and each containing data related to a corresponding attribute of the associated object;
- an object manager executing on said computing platform for sending object messages to said objects to perform actions on the associated object frame using the associated object methods, and for sending instance messages to said instances to perform actions on the associated instance frame using the associated object methods;
- a plurality of pointers stored on said computing platform, including pointers to first object classes from which class messages are redirected and corresponding pointers to second object classes to receive and process a redirected class message from the corresponding first object class, including pointers to third object classes from which instance messages are redirected and corresponding pointers to fourth object classes to receive and process a redirected instance message from the corresponding third object class, and including pointers to fifth object classes and corresponding pointers to sixth object classes which substitute for the corresponding fifth object class;
- class redirecting means, executing on said computing platform and responsive to a class message which is sent by said object manager executing on said computing platform to one of said first object classes during execution of said object oriented computing environment on said computing platform, and responsive to said plurality of stored pointers, for redirecting said class message which is sent to said one of said first object classes, to the corresponding one of said second object classes; and
- instance redirecting means, executing on said computing platform and responsive to an instance message which is sent by said object manager executing on said computing platform to one of said third object classes during execution of said object oriented computing environment on said computing platform, and responsive to said plurality of stored pointers, for redirecting said instance message which is sent to said one of said third object classes to the corresponding one of said fourth object classes; and
- class substituting means, executing on said computing platform and responsive to said plurality of stored pointers, for substituting one of said sixth object classes for the corresponding one of said fifth object classes in said hierarchy of object classes.

8. The system of claim 7 further including an eighth object class, said eighth object class being arranged in said hierarchy of classes as a child of said fifth object class, said class substituting means executing on said computing platform further comprising means for rearranging said hierarchy of classes such that said eighth object class is a child of said sixth object class and said eighth class is no longer a child of said fifth object class.

9. A system for configuring objects during execution of an object oriented computing environment on a computing platform comprising:
- a computing platform;
- a plurality of objects residing on said computing platform, each including an object frame containing data attributes and at least one object method for performing actions on the associated object, said objects being arranged in a hierarchy of object classes to define parent and child classes such that child classes inherit the data attributes and methods of parent classes;
- a plurality of instances residing on said computing platform, each associated with an object and each containing data related to a corresponding attribute of the associated object;
- an object manager executing on said computing platform for sending object messages to said objects to perform actions on the associated object frame using the associated object methods, and for sending instance messages to said instances to perform actions on the associated instance frame using the associated object methods;
- a plurality of pointers stored on said computing platform, including pointers to first object classes from which class messages are redirected and corresponding pointers to second object classes to receive and process a redirected class message from the corresponding first object class, and including pointers to third object classes from which instance messages are redirected and corresponding pointers to fourth object classes to receive and process a redirected instance message from the corresponding third object class;
- class redirecting means, executing on said computing platform and responsive to a class message which is sent by said object manager executing on said computing platform to one of said first object classes during execution of said object oriented computing environment on said computing platform, and responsive to said plurality of stored pointers, for redirecting said class message which is sent to said one of said first object classes, to the corresponding one of said second object classes; and
- instance redirecting means, executing on said computing platform and responsive to an instance message which is sent by said object manager executing on said computing platform to one of said third object classes during execution of said object oriented computing environment on said computing platform, and responsive to said plurality of stored pointers, for redirecting said instance message which is sent to said one of said third object classes to the corresponding one of said fourth object classes; and
- means, executing on said computing platform, for verifying that said fourth object class is a child of said third object class;
- wherein said instance redirecting means is further responsive to said verifying means for redirecting said instance message which is sent to said one of said third object classes, to the corresponding one of said second object classes only if said corresponding one of said fourth object classes is a child of said corresponding one of said third object classes.

10. The system of claim 9 further including a seventh object class, said seventh object class being arranged in said hierarchy of classes as a child of said third object class, said instance directing means executing on said computing platform further comprising means for preventing redirection from said seventh object class, of instance messages which are sent by said object manager to said seventh object class.

11. A method for configuring objects during execution of an object oriented computing environment on a computing platform, said object oriented computing environment including a plurality of objects residing on said computing platform, each including an object frame containing data attributes and at least one object method executing on said computing platform for performing actions on the associated object, said objects being arranged in a hierarchy of object classes to define parent and child classes such that child classes inherit the data attributes and methods of parent classes, said object oriented computing environment further including a plurality of instances residing on said computing platform, each associated with an object and each containing data related to a corresponding attribute of the associated object, said object oriented computing environment further including an object manager executing on said computing platform for sending object messages to said objects to perform actions on the associated object frame using the associated object methods, and for sending instance messages to said instances to perform actions on the associated instance frame using the associated object methods, said object configuring method comprising the following steps which are performed by said computing platform during execution of said object oriented programming environment on said computing platform:

storing pointers to first object classes from which class messages are redirected and corresponding pointers to second object classes to receive and process a redirected class message from the corresponding first object class;

storing pointers to third object classes from which instance messages are redirected and corresponding pointers to fourth object classes to receive and process a redirected instance message from the corresponding third object class;

redirecting a class message which is sent to one of said first object classes, to the corresponding one of said second object classes, in response to receipt of a class message which is sent by said object manager executing on said computing platform to said one of said first object classes during execution of said object oriented computing environment on said computing platform; and redirecting an instance message which is sent to one of said third object classes to the corresponding one of said fourth object classes in response to receipt of an instance message which is sent by said object manager executing on said computing platform to said one of said third object classes during execution of said object oriented computing environment on said computing platform;

storing pointers to fifth object classes and corresponding pointers to sixth object classes which substitute for the corresponding fifth object class; and substituting one of said sixth object classes for the corresponding one of said fifth object classes in said hierarchy of object classes.

12. The method of claim 11 wherein said object oriented computing environment further includes an eighth object class, said eighth object class being arranged in said hierarchy of classes as a child of said fifth object class, and wherein said substituting step is followed by the step of rearranging said hierarchy of classes such that said eighth object class is a child of said sixth object class and said eighth class is no longer a child of said fifth object class.

13. A method for configuring objects during execution of an object oriented computing environment on a computing platform, said object oriented computing environment including a plurality of objects residing on said computing platform each including an object frame containing data attributes and at least one object method executing on said computing platform for performing actions on the associated object, said objects being arranged in a hierarchy of object classes to define parent and child classes such that child classes inherit the data attributes and methods of parent classes, said object oriented computing environment further including a plurality of instances residing on said computing platform, each associated with an object and each containing data related to a corresponding attribute of the associated object, said object oriented computing environment further including an object manager executing on said computing platform for sending object messages to said objects to perform actions on the associated object frame using the associated object methods, and for sending instance messages to said instances to perform actions on the associated instance frame using the associated object methods, said object configuring method comprising the following steps which are performed by said computing platform during execution of said object oriented programming environment on said computing platform:

storing pointers to first object classes from which class messages are redirected and corresponding pointers to second object classes to receive and process a redirected class message from the corresponding first object class;

storing pointers to third object classes from which instance messages are redirected and corresponding pointers to fourth object classes to receive and process a redirected instance message from the corresponding third object class;

redirecting a class message which is sent to one of said first object classes, to the corresponding one of said second object classes, in response to receipt of a class message which is sent by said object manager executing on said computing platform to said one of said first object classes during execution of said object oriented computing environment on said computing platform;

verifying that said fourth object class is a child of said third object class; and redirecting an instance message which is sent to one of said third object classes to the corresponding one of said fourth object classes in response to receipt of an instance message which is sent by said object manager executing on said computing platform to said one of said third object classes during execution of said object oriented computing environment on said computing platform;

wherein said instance redirecting step further comprises the step of redirecting said instance message which is sent to said one of said third object classes, to the corresponding one of said second object classes, only if said corresponding one of said fourth object classes is a child of said corresponding one of said third object classes.

14. The method of claim 13 wherein said object oriented computing environment further includes a seventh object class, said seventh object class being arranged in said hierarchy of classes as a child of said third object class, and wherein said instance directing step is followed by the step of preventing redirection from said seventh object class, of instance messages which are sent by said object manager to said seventh object class.

15. A system for configuring objects in an object oriented computing environment comprising:

a computing platform;

a plurality of objects residing on said computing platform, each having an object identifier and each including an object frame containing data attributes and at least one object method for performing actions on the associated object, said objects being arranged in a hierarchy of object classes to define parent and child classes such that child classes inherit the data attributes and methods of parent classes;

a plurality of instances residing on said computing platform, each associated with an object and each having an instance frame containing data related to a corresponding attribute of the associated object;

an object manager executing on said computing platform for sending class messages to said objects to perform actions on the associated object frame using the associated object methods, and for sending instance messages to said instances to perform actions on the associated instance frame using the associated object methods;

a plurality of system data blocks residing on said computing platform, each associated with an object class and each including an instance redirecting pointer for identifying a system data block associated with a child class of the object class and a class redirecting pointer for identifying a system data block associated with a child class of the object class;

a plurality of object references residing on said computing platform, each associated with an object, and each including an instance identifying pointer for identifying an instance of the corresponding object, a system data block pointer for identifying the system data block of the class of said instance for the corresponding object, a class identifying pointer for identifying a class of the corresponding object, and a system data block pointer for identifying the system data block of the class of the corresponding object;

run time initialization means, executing on said computing platform and responsive to an instance redirect request to redirect a first parent class to a first child class, for setting the instance redirecting pointer in the system data block of said first parent class to identify the system data block associated with said first child class and further responsive to a class redirect request to redirect a second parent class to a second child class, for setting the class redirecting pointer in the system data block of said second parent class to identify the system data block associated with said second child class;

set object identification means, executing on said computing platform and responsive to said run time initialization means executing on said computing platform, for obtaining the associated instance redirecting pointer from the system data block for said first parent class, for obtaining the associated object identifier for said first parent class, and for storing the obtained instance redirecting pointer for said first parent class in the instance identifying pointer of the object reference of said first child class and for storing the obtained object identifier for said first parent class in the system data block pointer of the object reference of said first child class, and for obtaining the associated class redirecting pointer from the system data block for said second parent class, for obtaining the associated object identifier for said second parent class, for storing the obtained class redirecting pointer for said second parent class in the class identifying pointer of the object reference of said second child class, and for storing the obtained object identifier for said second parent class in the system data block pointer of the object reference of said second child class;

means, executing on said computing platform and responsive to an instance message which is directed to said first parent class, for obtaining the instance redirecting pointer and the object identifier from the object reference of said first child class, and for responding to said instance message using the obtained instance redirecting pointer and object identifier; and means, executing on said computer platform and responsive to a class message which is directed to said second parent class, for obtaining the class redirecting pointer and the object identifier from the object reference of said second child class, and for responding to said class message using the obtained class redirecting pointer and object identifier.

16. The system of claim 15:

wherein said first child class and said second child class are an identical child class; and wherein said first parent class and said second parent class are an identical parent class.

17. The system of claim 15:

wherein each system data block residing on said computing platform further includes a class substituting pointer for identifying a system data block associated with a child class of the object class; and wherein said run time initialization means executing on said computing platform is further responsive to a class substitute request to substitute a third child class for a third parent class, for setting the class substituting pointer in the system data block of said third parent class to identify the system data block associated with said third child class;

said system further comprising means, executing on said computing platform and responsive to a class message and an instance message which is directed to said third parent class for obtaining the class substituting pointer in the system data block of said third parent class, and responsive to the obtained class substituting pointer for replacing the system data block of said third child class with the system data block of said third parent class, such that said third child class substitutes for said third parent class.

18. The system of claim 17 wherein said run time initialization means executing on said computing platform further comprises means executing on said computing platform for confirming that the third parent class is a parent of the third child class.

19. The system of claim 17:
wherein said first child class, said second child class and said third child class are an identical child class; and
wherein said first parent class, said second parent class and said third parent class are an identical parent class.

20. A method for configuring objects in an object oriented computing environment on a computing platform, said object oriented computing environment including a plurality of objects residing on said computing platform, each having an object identifier and each including an object frame containing data attributes and at least one object method executing on said computing platform for performing actions on the associated object, said objects being arranged in a hierarchy of object classes to define parent and child classes such that child classes inherit the data attributes and methods of parent classes, said object oriented computing environment further including a plurality of instances residing on said computing platform, each associated with an object and each having an instance frame containing data related to a corresponding attribute of the associated object, said object oriented computing environment further including an object manager executing on said computing platform for sending class messages to said objects to perform actions on the associated object frame using the associated object methods, and for sending instance messages to said instances to perform actions on the associated instance frame using the associated object methods, said object oriented computing environment further including a plurality of system data blocks residing on said computing platform, each associated with an object class and each including an instance redirecting pointer for identifying a system data block associated with a child class of the object class, a class redirecting pointer for identifying a system data block associated with a child class of the object class, and a plurality of object references residing on said computing platform, each associated with an object, and each including an instance identifying pointer for identifying an instance of the corresponding object, a class identifying pointer for identifying a class of the corresponding object, and a system data block pointer for identifying the system data block of the class of the corresponding object and a system data block pointer for identifying the system data block of the class of said instance for the corresponding object, said object configuring method comprising the following steps which are performed by said computing platform during execution of said object oriented programming environment on said computing platform:
setting the instance redirecting pointer in the system data block of a first parent class to identify the system data block associated with a first child class, in response to an instance redirect request to redirect said first parent class to said first child class;
obtaining the associated instance redirecting pointer from the system data block for said first parent class;
obtaining the associated object identifier for said first parent class;
storing the obtained instance redirecting pointer in the instance identifying pointer of the object reference of said first child class;
storing the obtained object identifier in the system data block pointer of the object reference of said first child class;
obtaining the instance redirecting pointer and the object identifier from the object reference of said first child class, in response to an instance message which is directed to said first parent class;
responding to said instance message using the obtained instance redirecting pointer and object identifier, to thereby redirect instance messages from said first parent class to said first child class;
setting the class redirecting pointer in the system data block of a second parent class to identify the system data block associated with a second child class, in response to a class redirect request to redirect said second parent class to said second child class;
obtaining the associated class redirecting pointer from the system data block for said second parent class;
obtaining the associated object identifier for said second parent class;
storing the obtained class redirecting pointer in the class identifying pointer of the object reference of said second child class;
storing the obtained object identifier in the system data block pointer of the object reference of said second child class;
obtaining the class redirecting pointer and the object identifier from the object reference of said second child class, in response to a class message which is directed to said second parent class; and
responding to said class message using the obtained class redirecting pointer and object identifier, to thereby also redirect class messages from said second parent class to said second child class.

21. The method of claim 20:
wherein said first child class and said second child class are an identical child class; and
wherein said first parent class and said second parent class are an identical parent class.

22. The method of claim 20:
wherein each system data block further includes a class substituting pointer for identifying a system data block associated with a child class of the object class, said method further comprising the steps of:
setting the class substituting pointer in the system data block of a third parent class to identify the system data block associated with said a child class, in response to a class substitute request to substitute said third child class for said third parent class;
obtaining the class substituting pointer in the system data block of said third parent class, in response to a class message and an instance message which is directed to said third parent class; and
replacing the system data block of said third child class with the system data block of said third parent class, such that said third child class substitutes for said third parent class.

23. The method of claim 22 further comprising the step of confirming that the third parent class is a parent of the third child class, prior to performing said replacing step.

24. The method of claim 22:
wherein said first child class, said second child class and said third child class are an identical child class; and
wherein said first parent class, said second parent class and said third parent class are an identical parent class.

* * * * *

UNITED STATES PATENT AND TRADEMARK OFFICE
CERTIFICATE OF CORRECTION

PATENT NO. : 5,437,025

DATED : July 25, 1995

INVENTOR(S) : Bale et al.

It is certified that error appears in the above-identified patent and that said Letters Patent is hereby corrected as shown below:

On the cover page, under [75], in the listing for the third inventor, "Beauford" should be -- Buford --.

On the cover page, under [56], in the last line of the U.S. Patent Documents under References Cited, "Khoyl" should be -- Khoyi --.

Columns 15 and 16, in the tables under Case ## 1-4, the symbol ==> has been omitted between the columns in each table. Accordingly:

UNITED STATES PATENT AND TRADEMARK OFFICE
CERTIFICATE OF CORRECTION

PATENT NO. : 5,437,025
DATED : July 25, 1995
INVENTOR(S) : Bale et al.

It is certified that error appears in the above-identified patent and that said Letters Patent is hereby corrected as shown below:

Column 15, the table for Case #1 should read as follows:

```
        x_obj.find;           ==>
                                    X__find
        z_obj.find;           ==>
                                    Z__find
                                        X__find CLASS_REF(X).find;    ==>
                                    X__find
        CLASS_REF(Z).find;    ==>
                                    Z__find
                                        X__find x_obj.assign;         ==>
                                    X__assign
        z_obj.assign;         ==>
                                    Z__assign
                                        X__assign
```

UNITED STATES PATENT AND TRADEMARK OFFICE
CERTIFICATE OF CORRECTION

PATENT NO. : 5,437,025
DATED : July 25, 1995
INVENTOR(S) : Bale et al.

It is certified that error appears in the above-identified patent and that said Letters Patent is hereby corrected as shown below:

Columns 15-16, the table for Case #2 should read as follows:

```
        x_obj.find;         ==>
                                  Y__find
                                    X__find z_obj.find;         ==>
                                  Z__find
                                    Y__find
                                      X__find CLASS_REF(X).find;      ==>
                                  Y__find
                                    X__find CLASS_REF(Z).find;      ==>
                                  Z__find
                                    Y__find
                                      X__find x_obj.assign;       ==>
                                  Y__assign
                                    X__assign z_obj.assign;       ==>
                                  Z__assign
                                    Y__assign
                                      X__assign
```

UNITED STATES PATENT AND TRADEMARK OFFICE
CERTIFICATE OF CORRECTION

PATENT NO. : 5,437,025
DATED : July 25, 1995
INVENTOR(S) : Bale et al.

It is certified that error appears in the above-identified patent and that said Letters Patent is hereby corrected as shown below:

Column 16, the table for Case #3 should read as follows:

```
        x_obj.find;          ==>
                                    Y__find
                                       X__find z_obj.find;          ==>
                                    Z__find
                                       X__find CLASS_REF(X).find;   ==>
                                    Y__find
                                       X__find CLASS_REF(Z).find;   ==>
                                    Z__find
                                       X__find x_obj.assign;        ==>
                                    Y__assign
                                       X__assign z_obj.assign;        ==>
                                    Z__assign
                                       X__assign
```

UNITED STATES PATENT AND TRADEMARK OFFICE
CERTIFICATE OF CORRECTION

PATENT NO.   : 5,437,025                    Page 5 of 5
DATED        : July 25, 1995
INVENTOR(S)  : Bale et al.

It is certified that error appears in the above-identified patent and that said Letters Patent is hereby corrected as shown below:

Column 16, the table for Case #4 should read as follows:

```
        x_obj.find;         ==>
                                    X__find
        z_obj.find;         ==>
                                    Z__find
                                        X__find
        CLASS_REF(X).find;  ==>
                                    Y__find
                                        X__find
        CLASS_REF(Z).find;  ==>
                                    Z__find
                                        X__find
        x_obj.assign;       ==>
                                    X__assign
        z_obj.assign;       ==>
                                    Z__assign
                                        X__assign
```

Column 33, line 8, before "pragma" insert -- # --.

Signed and Sealed this

Twenty-fourth Day of October, 1995

Attest:

BRUCE LEHMAN

*Attesting Officer*          *Commissioner of Patents and Trademarks*